US012092756B1

(12) United States Patent
Parker et al.

(10) Patent No.: US 12,092,756 B1
(45) Date of Patent: Sep. 17, 2024

(54) DETERRENT FOR UNMANNED AERIAL SYSTEMS

(71) Applicant: XiDrone Systems, Inc., Naples, FL (US)

(72) Inventors: Dwaine A. Parker, Naples, FL (US);
Damon E. Stern, Riverview, FL (US);
Lawrence S. Pierce, Huntsville, AL (US)

(73) Assignee: XiDrone Systems, Inc., Naples, FL (US)

( * ) Notice: Subject to any disclaimer, the term of this patent is extended or adjusted under 35 U.S.C. 154(b) by 0 days.

(21) Appl. No.: 18/439,171

(22) Filed: Feb. 12, 2024

Related U.S. Application Data

(63) Continuation of application No. 18/126,470, filed on Mar. 26, 2023, now Pat. No. 11,965,977, which is a
(Continued)

(51) Int. Cl.
*G01S 7/38* (2006.01)
*F41H 11/02* (2006.01)
(Continued)

(52) U.S. Cl.
CPC ............... *G01S 7/38* (2013.01); *F41H 11/02* (2013.01); *F41H 13/0075* (2013.01);
(Continued)

(58) Field of Classification Search
CPC ............ G01S 7/021; G01S 7/38; G01S 13/86; G01S 13/88; G01S 13/883; G01S 13/9303; G01S 13/91; F41H 11/02
See application file for complete search history.

(56) References Cited

U.S. PATENT DOCUMENTS 3,668,403 A * 6/1972 Meilander ............... G01S 13/46
342/36
3,754,249 A * 8/1973 Kearney, II ............. F41G 7/007
244/3.13
(Continued)

FOREIGN PATENT DOCUMENTS

DE 102015008296 B4 8/2017
FR 2983973 6/2013
(Continued)

OTHER PUBLICATIONS

N9310A RF Signal Generator, 9kHz to 3 GHz, Key Features & Specifications, Keysight Technologies {1994), retrieved Nov. 14, 2017, 2 pages.
(Continued)

*Primary Examiner* — Peter M Bythrow
(74) *Attorney, Agent, or Firm* — Nixon & Vanderhye P.C.

(57) ABSTRACT

A system for providing integrated detection and deterrence against an unmanned vehicle including but not limited to aerial technology unmanned systems using a detection element, a tracking element, an identification element and an interdiction or deterrent element. Elements contain sensors that observe real time quantifiable data regarding the object of interest to create an assessment of risk or threat to a protected area of interest. This assessment may be based e.g., on data mining of internal and external data sources. The deterrent element selects from a variable menu of possible deterrent actions. Though designed for autonomous action, a Human in the Loop may override the automated system solutions.

30 Claims, 7 Drawing Sheets

Related U.S. Application Data continuation of application No. 17/828,754, filed on May 31, 2022, now Pat. No. 11,644,535, which is a continuation of application No. 17/214,413, filed on Mar. 26, 2021, now Pat. No. 11,378,651, which is a continuation of application No. 16/876,387, filed on May 18, 2020, now Pat. No. 11,035,929, which is a continuation of application No. 16/183,935, filed on Nov. 8, 2018, now Pat. No. 10,670,696, which is a continuation of application No. 15/627,229, filed on Jun. 19, 2017, now Pat. No. 10,156,631, which is a continuation of application No. 15/368,269, filed on Dec. 2, 2016, now Pat. No. 9,715,009, which is a continuation-in-part of application No. 14/821,907, filed on Aug. 10, 2015, now Pat. No. 9,689,976.

(60) Provisional application No. 62/094,154, filed on Dec. 19, 2014.

(51) Int. Cl.
  *F41H 13/00* (2006.01)
  *G01S 3/782* (2006.01)
  *G01S 7/02* (2006.01)
  *G01S 7/41* (2006.01)
  *G01S 13/42* (2006.01)
  *G01S 13/66* (2006.01)
  *G01S 13/86* (2006.01)
  *G01S 13/88* (2006.01)
  *G01S 13/91* (2006.01)
  *G01S 13/933* (2020.01)

(52) U.S. Cl.
  CPC .............. *G01S 3/782* (2013.01); *G01S 7/414* (2013.01); *G01S 13/42* (2013.01); *G01S 13/66* (2013.01); *G01S 13/86* (2013.01); *G01S 13/88* (2013.01); *G01S 7/021* (2013.01); *G01S 13/883* (2013.01); *G01S 13/91* (2013.01); *G01S 13/933* (2020.01)

(56) References Cited

U.S. PATENT DOCUMENTS

| | | | | |
|---|---|---|---|---|
| 3,981,010 | A * | 9/1976 | Michelsen | G01S 13/84 342/55 |
| 4,016,565 | A | 4/1977 | Walker | |
| 4,178,596 | A | 12/1979 | Rowlett | |
| 4,468,656 | A | 8/1984 | Clifford | |
| 4,652,885 | A * | 3/1987 | Saffold | H01Q 5/45 343/781 CA |
| 4,698,638 | A * | 10/1987 | Branigan | F41G 7/008 342/53 |
| 4,723,311 | A | 2/1988 | Moustakas et al. | |
| 4,727,537 | A | 2/1988 | Nichols | |
| 4,746,924 | A | 5/1988 | Lighfoot | |
| 4,780,719 | A * | 10/1988 | Frei | G01S 13/86 342/67 |
| 4,825,435 | A | 4/1989 | Amundsen et al. | |
| 4,990,814 | A | 2/1991 | Tanski et al. | |
| 5,005,147 | A * | 4/1991 | Krishen | G06F 18/256 703/13 |
| 5,187,485 | A | 2/1993 | Tsui | |
| 5,268,680 | A * | 12/1993 | Zantos | F41G 7/226 343/781 CA |
| 5,307,077 | A * | 4/1994 | Branigan | G01S 13/66 343/781 CA |
| 5,327,149 | A * | 7/1994 | Kuffer | H01Q 21/28 343/781 CA |
| 5,341,142 | A * | 8/1994 | Reis | F41G 7/2293 342/63 |
| 5,381,150 | A * | 1/1995 | Hawkins | G01R 23/165 342/13 |
| 5,402,129 | A * | 3/1995 | Gellner | G01S 13/44 342/70 |
| 5,442,168 | A | 8/1995 | Gurner et al. | |
| 5,554,990 | A * | 9/1996 | McKinney | G01S 7/22 342/36 |
| 5,557,278 | A * | 9/1996 | Piccirillo | G01S 13/91 342/36 |
| 5,728,965 | A * | 3/1998 | Fesland | G05D 1/695 244/190 |
| 5,884,040 | A | 3/1999 | Chung | |
| 5,930,696 | A | 7/1999 | Tzuang | |
| 5,996,646 | A | 10/1999 | Lampe et al. | |
| 6,081,764 | A * | 6/2000 | Varon | G08G 5/045 342/36 |
| 6,087,974 | A * | 7/2000 | Yu | F41G 7/2246 342/149 |
| 6,262,679 | B1 * | 7/2001 | Tran | G08G 5/0078 342/36 |
| 6,529,820 | B2 * | 3/2003 | Tomescu | G08G 5/0082 342/36 |
| 6,563,453 | B1 * | 5/2003 | Wilson | G01S 13/782 342/29 |
| 6,564,149 | B2 * | 5/2003 | Lai | G01S 13/933 340/963 |
| 6,690,296 | B2 * | 2/2004 | Corwin | G01S 13/782 340/963 |
| 6,697,008 | B1 | 2/2004 | Sternowski | |
| 6,707,052 | B1 * | 3/2004 | Wild | F41H 11/02 342/14 |
| 6,868,314 | B1 | 3/2005 | Frink | |
| 6,877,691 | B2 * | 4/2005 | DeFlumere | G01S 7/4802 342/52 |
| 6,903,676 | B1 * | 6/2005 | Frady | G01S 13/723 342/52 |
| 6,992,614 | B1 | 1/2006 | Joyce | |
| 7,202,809 | B1 * | 4/2007 | Schade | F41H 11/02 89/1.816 |
| 7,205,932 | B2 * | 4/2007 | Fiore | G01S 13/449 342/149 |
| 7,236,766 | B2 | 6/2007 | Freeburg | |
| 7,283,840 | B2 | 10/2007 | Cho | |
| 7,336,939 | B2 | 2/2008 | Gomez | |
| 7,339,981 | B2 | 3/2008 | Dogan | |
| 7,437,225 | B1 * | 10/2008 | Rathinam | G05D 1/0027 342/36 |
| 7,492,308 | B2 * | 2/2009 | Benayahu | F41H 7/00 342/55 |
| 7,504,982 | B2 * | 3/2009 | Berg | F41G 7/224 342/13 |
| 7,542,828 | B2 | 6/2009 | Steele | |
| 7,548,184 | B2 * | 6/2009 | Lo | G01S 13/865 342/52 |
| 7,551,121 | B1 * | 6/2009 | O'Connell | F41G 5/08 342/60 |
| 7,567,202 | B2 | 7/2009 | Pearson et al. | |
| 7,593,706 | B2 | 9/2009 | Bucknor et al. | |
| 7,619,555 | B2 * | 11/2009 | Rolfe | H04B 7/18506 342/36 |
| 7,683,782 | B2 | 3/2010 | Christopher | |
| 7,684,020 | B1 | 3/2010 | Marti et al. | |
| 7,728,755 | B1 | 6/2010 | Jocic | |
| 7,782,256 | B2 * | 8/2010 | Smith | G01S 13/726 342/453 |
| 7,853,261 | B1 | 12/2010 | Lewis et al. | |
| 7,898,454 | B1 * | 3/2011 | Starkey | G01S 7/38 342/14 |
| 7,961,133 | B2 * | 6/2011 | Vollin | F41G 7/224 342/67 |
| 8,161,440 | B2 | 4/2012 | Lontka | |
| 8,204,494 | B2 | 6/2012 | Weinzierl | |
| 8,212,709 | B2 * | 7/2012 | Bradley | F41G 7/224 342/13 |
| 8,258,994 | B2 * | 9/2012 | Hamilton | F41G 7/224 250/493.1 |

(56) References Cited

U.S. PATENT DOCUMENTS

| | | | |
|---|---|---|---|
| 8,258,998 B2* | 9/2012 | Factor | G01S 13/867 342/13 |
| 8,305,196 B2 | 11/2012 | Kennedy et al. | |
| 8,330,641 B2* | 12/2012 | Ryden | H04K 3/42 342/14 |
| 8,375,837 B2 | 2/2013 | Goossen | |
| 8,378,880 B1* | 2/2013 | Boka | F41G 7/2206 342/52 |
| 8,378,881 B2* | 2/2013 | LeMire | G01S 13/87 342/63 |
| 8,429,655 B2 | 4/2013 | Yun | |
| 8,464,949 B2* | 6/2013 | Namey | F41G 3/14 235/404 |
| 8,483,703 B2 | 7/2013 | Swope et al. | |
| 8,543,053 B1 | 9/2013 | Melamed et al. | |
| 8,543,265 B2* | 9/2013 | Ekhaguere | G08G 5/0021 701/423 |
| 8,655,348 B2 | 2/2014 | Zha | |
| 8,750,903 B1 | 6/2014 | Fitzsimmons et al. | |
| 8,761,687 B2 | 6/2014 | Chang et al. | |
| 8,798,922 B2 | 8/2014 | Tillotson | |
| 8,824,966 B2 | 9/2014 | Boes | |
| 8,909,304 B1 | 12/2014 | Coleman | |
| 9,041,798 B1* | 5/2015 | Yerkes | H04N 7/188 348/148 |
| 9,048,944 B2 | 6/2015 | Boes | |
| 9,085,362 B1 | 7/2015 | Kilian | |
| 9,170,069 B1* | 10/2015 | Smith | F41G 7/224 |
| 9,175,934 B1* | 11/2015 | Kilian | F41H 11/02 |
| 9,204,488 B2 | 12/2015 | Bai | |
| 9,212,869 B1* | 12/2015 | Boardman | G01S 13/726 |
| 9,246,629 B2 | 1/2016 | Coleman | |
| 9,405,005 B1* | 8/2016 | Arteaga | G08G 5/0021 |
| 9,495,877 B2* | 11/2016 | Duffy | G08G 5/0013 |
| 9,508,264 B2* | 11/2016 | Chan | G08G 5/0039 |
| 9,524,648 B1 | 12/2016 | Gopalakrishnan | |
| 9,529,360 B1 | 12/2016 | Melamed et al. | |
| 9,677,852 B2* | 6/2017 | Tikochinski | F41H 13/0087 |
| 9,689,976 B2 | 6/2017 | Parker | |
| 9,715,009 B1 | 7/2017 | Parker | |
| 9,854,556 B2 | 12/2017 | Skaaksrud | |
| 9,971,021 B2 | 5/2018 | Moses et al. | |
| 9,977,117 B2 | 5/2018 | Parker | |
| 10,156,631 B2 | 5/2018 | Parker | |
| 9,995,819 B1* | 6/2018 | Akhund | G01S 7/2922 |
| 10,122,736 B2 | 11/2018 | Baxley et al. | |
| 10,281,570 B2 | 5/2019 | Parker | |
| 10,572,851 B2 | 2/2020 | Skaaksrud | |
| 10,771,993 B2 | 9/2020 | Althoff | |
| 10,782,097 B2* | 9/2020 | Hall | F41A 19/64 |
| 10,788,588 B2 | 9/2020 | Ferguson | |
| 11,064,363 B2 | 7/2021 | Fox et al. | |
| 2002/0190891 A1 | 12/2002 | Viana et al. | |
| 2003/0174763 A1 | 9/2003 | Kouki | |
| 2004/0021852 A1* | 2/2004 | DeFlumere | F41G 7/2246 356/141.1 |
| 2004/0057537 A1 | 3/2004 | Kim | |
| 2004/0130488 A1 | 7/2004 | DeChamplain | |
| 2004/0166878 A1 | 8/2004 | Erskine et al. | |
| 2004/0203748 A1 | 10/2004 | Kappes et al. | |
| 2004/0249519 A1* | 12/2004 | Frink | B64D 45/0059 701/9 |
| 2005/0040909 A1 | 2/2005 | Waight | |
| 2005/0108374 A1 | 5/2005 | Pierzga | |
| 2006/0028373 A1* | 2/2006 | Fullerton | F41H 11/00 342/67 |
| 2006/0028374 A1* | 2/2006 | Fullerton | F41G 5/08 342/67 |
| 2006/0063485 A1 | 3/2006 | Gainey et al. | |
| 2006/0092075 A1* | 5/2006 | Bruce | G01S 7/02 342/149 |
| 2006/0105606 A1* | 5/2006 | Nichols | G01C 21/20 701/3 |
| 2006/0106506 A1* | 5/2006 | Nichols | G01C 21/20 701/3 |
| 2006/0164282 A1 | 7/2006 | Duff | |
| 2006/0175464 A1* | 8/2006 | Chang | F42B 12/32 244/3.15 |
| 2006/0188033 A1 | 8/2006 | Zehavi et al. | |
| 2007/0052580 A1* | 3/2007 | Fiore | G01S 13/32 342/146 |
| 2007/0060055 A1 | 3/2007 | Desai et al. | |
| 2007/0099667 A1 | 5/2007 | Graham et al. | |
| 2007/0226247 A1 | 9/2007 | Ferm | |
| 2007/0285280 A1 | 12/2007 | Robinson et al. | |
| 2008/0018519 A1* | 1/2008 | Berg | F41H 13/0068 342/67 |
| 2008/0088508 A1* | 4/2008 | Smith | G01S 13/878 342/453 |
| 2008/0191924 A1 | 8/2008 | Duff | |
| 2009/0061870 A1 | 3/2009 | Finklestein et al. | |
| 2009/0098847 A1 | 4/2009 | Noujeim | |
| 2009/0174589 A1 | 7/2009 | Moraites | |
| 2009/0273504 A1 | 11/2009 | Meyers | |
| 2009/0292468 A1* | 11/2009 | Wu | G08G 1/165 342/146 |
| 2010/0010793 A1 | 1/2010 | Herman | |
| 2010/0042269 A1* | 2/2010 | Kokkeby | G05D 1/0094 701/3 |
| 2010/0082180 A1 | 4/2010 | Wright et al. | |
| 2010/0170383 A1 | 7/2010 | Wilner | |
| 2010/0174475 A1 | 7/2010 | Estkowski | |
| 2010/0253567 A1 | 10/2010 | Factor | |
| 2010/0272012 A1 | 10/2010 | Knefelkamp | |
| 2010/0315281 A1* | 12/2010 | Askelson | G08G 5/0013 703/2 |
| 2011/0002687 A1 | 1/2011 | Sabat, Jr. et al. | |
| 2011/0117870 A1 | 5/2011 | Pera | |
| 2011/0267222 A1 | 11/2011 | Craig | |
| 2012/0092208 A1 | 4/2012 | LeMire | |
| 2012/0143482 A1* | 6/2012 | Goossen | G08G 5/0034 701/120 |
| 2012/0170024 A1 | 7/2012 | Azzazy | |
| 2012/0170029 A1 | 7/2012 | Azzazy | |
| 2012/0192707 A1* | 8/2012 | Rogers | F41H 13/0006 89/930 |
| 2012/0211562 A1* | 8/2012 | Cook | F41F 3/055 235/400 |
| 2012/0217301 A1* | 8/2012 | Namey | F41G 3/04 235/411 |
| 2012/0235881 A1 | 9/2012 | Pan | |
| 2012/0299765 A1 | 11/2012 | Huang et al. | |
| 2012/0309288 A1 | 12/2012 | Lu | |
| 2012/0322459 A1 | 12/2012 | Jaffri et al. | |
| 2013/0023201 A1 | 1/2013 | Coleman et al. | |
| 2013/0157599 A1 | 6/2013 | Ray | |
| 2013/0244712 A1 | 9/2013 | Kuzio et al. | |
| 2013/0297271 A1 | 11/2013 | Herman | |
| 2013/0316659 A1 | 11/2013 | Ylamurto | |
| 2013/0321199 A1* | 12/2013 | Suwa | G01S 13/5246 342/195 |
| 2014/0102288 A1* | 4/2014 | Yeshurun | F41H 11/00 89/36.17 |
| 2014/0111372 A1 | 4/2014 | Wu | |
| 2014/0138474 A1* | 5/2014 | Sharpin | F42B 15/01 244/3.22 |
| 2014/0200875 A1* | 7/2014 | Yuksel Ergun | F41G 3/32 703/21 |
| 2014/0209678 A1 | 7/2014 | Factor | |
| 2014/0251123 A1* | 9/2014 | Venema | F41G 3/06 89/41.22 |
| 2014/0253378 A1 | 9/2014 | Hinman | |
| 2014/0257692 A1 | 9/2014 | Stefani | |
| 2014/0266851 A1* | 9/2014 | Fink | G01S 19/215 342/14 |
| 2014/0269650 A1 | 9/2014 | Sahota | |
| 2014/0277854 A1 | 9/2014 | Jones | |
| 2015/0133067 A1 | 5/2015 | Chang et al. | |
| 2015/0210359 A1 | 7/2015 | McClure | |
| 2015/0214926 A1 | 7/2015 | Tohidian et al. | |
| 2015/0226834 A1 | 8/2015 | Floch | |

(56) References Cited

U.S. PATENT DOCUMENTS

| | | |
|---|---|---|
| 2015/0229434 A1 | 8/2015 | Shawn |
| 2015/0254988 A1* | 9/2015 | Wang .................... B64C 39/024 701/3 |
| 2015/0302858 A1 | 10/2015 | Hearing |
| 2015/0304783 A1 | 10/2015 | Yang et al. |
| 2015/0304869 A1 | 10/2015 | Johnson |
| 2015/0312835 A1 | 10/2015 | Subramanian |
| 2015/0350914 A1 | 12/2015 | Baxley |
| 2015/0370250 A1 | 12/2015 | Bachrach |
| 2016/0023760 A1 | 1/2016 | Goodrich |
| 2016/0025850 A1* | 1/2016 | Rigsby .................... G01S 13/72 342/61 |
| 2016/0117931 A1* | 4/2016 | Chan .................... G08G 5/0043 701/120 |
| 2016/0245907 A1 | 8/2016 | Parker et al. |
| 2016/0327956 A1 | 11/2016 | Zhang |
| 2016/0357192 A1* | 12/2016 | McGrew ............. G05D 1/0044 |
| 2016/0358483 A1* | 12/2016 | Park ........................ G01S 13/91 |
| 2017/0039413 A1 | 2/2017 | Nadler |
| 2017/0069214 A1 | 3/2017 | Dupray |
| 2017/0076610 A1 | 3/2017 | Liu |
| 2017/0092138 A1 | 3/2017 | Trundle et al. |
| 2017/0094527 A1 | 3/2017 | Shattil |
| 2017/0148332 A1 | 5/2017 | Ziemba |
| 2017/0148467 A1 | 5/2017 | Franklin |
| 2017/0219676 A1 | 8/2017 | Tran |
| 2017/0261613 A1 | 9/2017 | Van Voorst |
| 2017/0308085 A1 | 10/2017 | Hall |
| 2017/0372617 A1 | 12/2017 | Bruno |
| 2018/0038675 A1 | 2/2018 | Graswald |
| 2018/0128895 A1 | 5/2018 | Seeber |
| 2018/0129882 A1 | 5/2018 | Seeber |
| 2018/0162502 A1 | 6/2018 | McClure |
| 2019/0271781 A1 | 9/2019 | Fink |
| 2019/0360783 A1 | 11/2019 | Whittaker |
| 2020/0008059 A1 | 1/2020 | Fox et al. |
| 2020/0043346 A1 | 2/2020 | Vacek |
| 2020/0158822 A1* | 5/2020 | Owens .................... H01Q 1/526 |
| 2020/0233091 A1 | 7/2020 | Fink |
| 2020/0301426 A1 | 9/2020 | Bullock |
| 2021/0092604 A1 | 3/2021 | Fox et al. |

FOREIGN PATENT DOCUMENTS

| | | |
|---|---|---|
| GB | 2536043 | 9/2016 |
| RU | 72753 | 4/2008 |
| RU | 72754 | 4/2008 |
| RU | 2551821 C1 | 5/2015 |
| WO | 2017040254 A1 | 3/2017 |
| WO | 2019067627 A1 | 4/2019 |

OTHER PUBLICATIONS

Smart Sensor Radar System, Vista Radar Systems {1994}, Raven Aerostar, Product Overview, retrieved Nov. 14, 2017, 2 pages.

Winradio MS-8118/G3 Multichannel Radio Monitoring System (1994), Product Overview, retrieved Nov. 14, 2017, 2 pages.

RF Power Amplifiers, High Power-6GHz and below, Empower RF Systems, Inc. {1994}, retrieved Nov. 14, 2017, 1 page.

Winradio WD-3300 High Performance Portable Direction Finding System (1994), Product Overview, retrieved Nov. 14, 2017, 2 pages.

Intenational Preliminary Report on Patentability and Written Opinion of the International Searching Authority dated Jun. 29, 2017, issued in related International Application No. PCT/US2015/059698.

Kerns, Andrew J., et al., "Unmanned Aircraft Capture and Control via GPS Spoofing," Journal of Robotics, vol. 31, No. 4, Jul. 2014, 29 pages.

Rassler, Don, "Remotely Piloted Innovation: Terrorism, Drones and Supportive Technology," Combating Terrorism Center at West Point, United States Military Academy, Oct. 2016, 77 pages.

Ying, Gao, et al., "Design and Realization of Virtual Scene System in UAV Electronic Warfare," International Conference on Information Engineering and Computer Science, IEEE, 2009,4 pages.

"In the battle for Mosul, grenades rain down from ISIS drones," Rudaw, Jan.7, 2017, 3 pages.

"Liteye and Tribalco Team to Deliver AUDS Counter Drone Systems to U.S. Military Customers," PR Newswire, Jan. 12, 2017, 3 pages.

Watson, Ben, "The Drones of ISIS," Defense One, Jan. 12, 2017, 10 pages.

Office Action dated Apr. 4, 2017, issued in related U.S. Appl. No. 14/821,907.

Notice of Allowance and Fee{s} Due dated May 15, 2017, issued in related U.S. Appl. No. 14/821,907.

Muraru, Adrian, "An Overview on the Concept of UAV Survivability", International Conference of Scientific Paper Afases 2011, pp. 1231-1236 {May 26-28, 2011) (6 pages).

Tham, Kine Seng, "Enhancing combat survivability of existing unmanned aircraft systems", Calhoun Institutional Archive of the Naval Postgraduate School {Dec. 2008) (150 pages).

Sanders, Christopher P., "Real-time Collision Avoidance for Autonomous Air Vehicles", MS Thesis, Massachusetts Institute of Technology {Jan. 1998) (156 pages).

Tso et al, "A Multi-Agent Operator Interface for Unmanned Aerial Vehicles, Proceedings of the 18th Digital Avionics Systems Conference", vol. 2 {Oct. 24-29, 1999) (17 pages).

Kaminski, Margot E., "Drone Federalism: Civilian Drones and the Things They Carry", California Law Review Circuit, vol. 4, No. 57, pp. 57-74 {May 2013) (19 pages).

Elias, Bart, "Pilotless Drones: Background and Considerations for Congress Regarding Unmanned Aircraft Operations in the National Airspace System", Congressional Research Service, pp. 1-21 {Sep. 10, 2012) (24 pages).

Samland et al., "AR.Drone: security threat analysis and exemplary attack to track persons", Proceedings of SPIE—The International Society for Optical Engineering 8301: 15 {Jan. 2012) 001:10.1117/12.902990 (15 pages).

Albanesius, Chloe, "SkyJack' Software Finds and Hijacks Drones" PC Magazine {Dec. 4, 2013) (1 page).

Teschler, Lee, "You knew this was coming: Hacker figures out how to skyjack drones", MachineDesign {Dec. 9, 2013) (1 page).

Austin, Reg, "Unmanned Aircraft Systems: UAVS Design, Development and Deployment", pp. 1-332 {John Wiley and Sons, Ltd., 2010) (365 pages).

Pleban et al., "Hacking and securing the AR.Drone 2.0 quadcopter—Investigations for improving the security of a toy", Proceedings of SPIE—The International Society for Optical Engineering (Jan. 2014) D0I:10.1117/12-2044868.

Beel, Joseph J., "Anti-UAV Defense Requirements for Ground Forces and Hypervelocity Rocket Lethality Models", Naval Postgraduate School, Thesis (Mar. 1992) (122 pages).

Agbeyibor, Richard C., "Secure ADS-B: Towards Airborne Communications Security in the Federal Aviation Administration's Next Generation Air Transportation System", Air Force Institute of Technology (Mar. 14, 2014) (105 pages).

Wesson et al., "Unhackable Drones: The Challenges of Securely Integrating Unmanned Aircraft Into the National Airspace" (Apr. 1, 2013) (7 pages).

Final Office Action dated Mar. 2, 2021 in U.S. Appl. No. 17/001,254, filed Aug. 24, 2020.

Molchanov et al., "Classification of small UAVs and birds by micro-Doppler signatures", International Journal of Microwave and Wireless Technologies, 2014, pp. 435-444, Cambridge University Press and the European Microwave Association (10 pages).

U.S. Notice of Allowance dated Jun. 24, 2021 in commonly assigned U.S. Appl. No. 17/001,254 (42 pages).

U.S. Appl. No. 62/406,834, filed Oct. 11, 2016 of Fox et al.

U.S. Appl. No. 62/727,455, filed Sep. 5, 2018 of Fox et al.

Birch et al., "UAS Detection, Classification, and Neutralization: Market Survey 2015", Sandia National Laboratories, Sandia Report, SAND2015-6365, Unlimited Release, 2015, pp. 1-74.

U.S. Office Action dated Jul. 16, 2021 in commonly assigned U.S. Appl. No. 17/214,413 (47 pages).

(56) References Cited

OTHER PUBLICATIONS

Google Patents printed version of Fink, U.S. Pat. No. 20140266851 A1 (Mar. 14, 2013)https://patents.google.com/patent/US20140266851A1/en?oq=20140266851.

Memorandum Opinion and Order, XiDrone Systems, Inc. vs. 911 Security Inc., Civil Action No. 3:21-CV-2669-N, Sep. 27, 2022 (9 pages).

https://web.archive.org/web/20141101031543/http:/enrgies.com/index.php?option=com_content&view=article&id=115&Itemid=145 (2014).

https://web.archive.org/web/20141031131138/http:/enrgies.com/index.php?option=com_content&view=article&id=119&Itemid=149 (2104).

The Forward Area Air Defense Command and Control (FAAD C2) https://www.dacis.com/budget/budget_pdf/FY15/RDTE/A/0604741A_96.pdf.

Docket for XiDrone Systems v. Fortem Technologies, Case No. 2:23-cv-00430-HCN-DBP, US District Court for District of Utah.

"Summary Table" (Feb. 8, 2024) in file history of U.S. Appl. No. 18/126,470.

"Blighter Anti-UAV Defence Systems (AUDS)", Blighter Surveillance Systems Ltd, 3 p. 2015/09/03.

Youtube Video, "AUDS—Anti-UAV Defence System", Blighter Surveillance Systems Ltd, https://youtu.be/P8aZ0zWX3SA?si=nJ47yUQQxU1kcNxs (May 11, 2015, page retrieved recently).

Youtube channel, https://www.youtube.com/@Blighter "Blighter Surveillance Systems Ltd" (2024).

Groves, "Principles of GNSS, Inertial, and Multisensor Integrated Navigation Systems" Second Edition, pp. 1-22 GNSS Technology and Applications Series (Artech House 2013).

"AUDS Anti-UAV Defence System" Strategic Counter-UAS Systems, Blighter Surveillance Systems Ltd, AUDS-0103 8 pages (Sep. 2017).

"Blighter AUDS (Anti UAV Defence System)" Blighter Surveillance Systems BSS-1400 (2015).

\* cited by examiner

DETERRENT FOR UNMANNED AERIAL SYSTEMS

CROSS-REFERENCE TO RELATED APPLICATIONS

This application is a continuation of U.S. patent application Ser. No. 18/126,470 filed Mar. 26, 2023, which is a continuation of U.S. patent application Ser. No. 17/828,754, filed May 31, 2022, now U.S. Pat. No. 11,644,535; which is a continuation of U.S. patent application Ser. No. 17/214,413, filed Mar. 26, 2021, now U.S. Pat. No. 11,378,651; which is a continuation of U.S. patent application Ser. No. 16/876,387, filed May 18, 2020, now U.S. Pat. No. 11,035,929; which is a continuation of U.S. patent application Ser. No. 16/183,935, filed Nov. 8, 2018; now U.S. Pat. No. 10,670,696; which is a continuation of U.S. patent application Ser. No. 15/627,229 filed Jun. 19, 2017; now U.S. Pat. No. 10,156,631; which is a continuation of U.S. patent application Ser. No. 15/368,269 filed Dec. 2, 2016, now U.S. Pat. No. 9,715,009; which is a continuation-in-part of U.S. patent application Ser. No. 14/821,907 filed Aug. 10, 2015, now U.S. Pat. No. 9,689,976; which claims benefit of U.S. Provisional Application No. 62/094,154 filed Dec. 19, 2014. The disclosures of each of these prior applications are incorporated herein in their entirety by reference.

STATEMENT REGARDING FEDERALLY SPONSORED RESEARCH OR DEVELOPMENT

None.

FIELD

The technology herein relates to reliable detection and interdiction of unmanned aerial systems such as drones.

BACKGROUND AND SUMMARY

Small Unmanned Aerial Systems (SUAS), weighing less than 20 kg or 55 pounds, which are commonly referred to as "drones", are commercially available to the general public. Drone—designated as 44 in FIG. 1A, thus refers to an unmanned aircraft or ship guided by remote control or onboard computers, allowing for human correction (i.e., semi-autonomous), or autonomous, see also UAV, UAS, SUAS, RPA. While there may be many safe commercial and recreational uses for unmanned aerial systems, recent publicized events tell us that significant hazards exist to commercial and general aviation, public, private and government interests even if a drone is operated without malicious intent. Furthermore, unmanned aerial systems have been used intentionally to violate the privacy of personal, commercial, educational, athletic, entertainment and governmental activities. An unintended consequence of off-the-shelf (OTS) commercially available unmanned aerial systems is the capability to be used in the furtherance of invading privacy, or carrying out terrorist and/or criminal activities. There is a genuine need for an integrated system and method of detecting, tracking, identifying/classifying and deterring the approach of a commercial unmanned aerial system towards a location where personal, public, commercial, educational, athletic, entertainment, governmental and military activities occur and where a commercial unmanned aerial system could potentially be used for invading privacy, or carrying out terrorist and criminal activities within a civilian environment.

DETAILED DESCRIPTION OF EXAMPLE NON-LIMITING EMBODIMENTS

Figure 1:
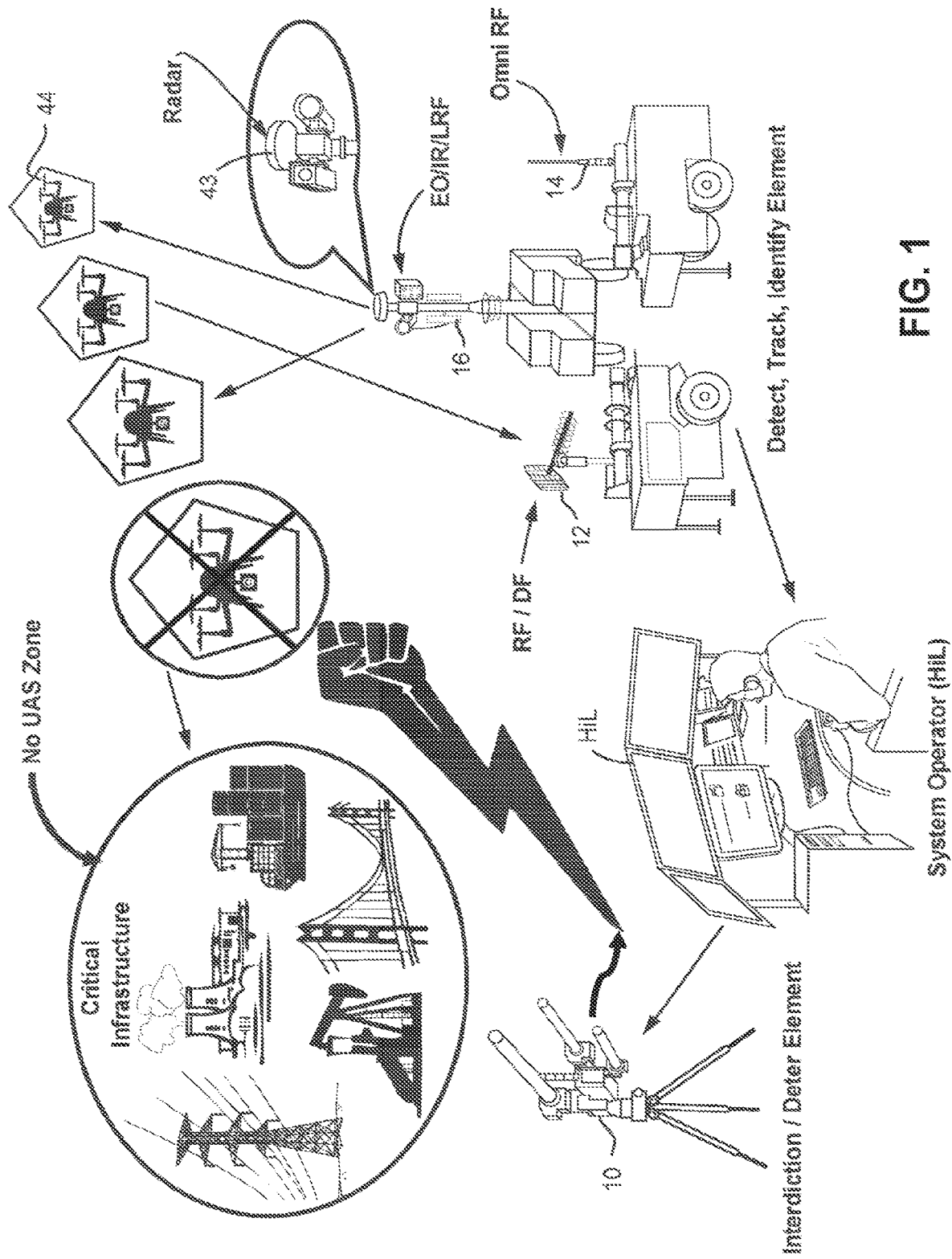
FIG. 1 shows an example of non-limiting drone detection, classification and interdiction system.

FIG. 1 shows an example non-limiting system for detecting, tracking, classifying and interdicting a UAS such as a drone 44. In the example shown, several different sensors using different technologies are used to detect the target 44. Such sensors include, in one non-limiting embodiment, a commercial ground based radar 43; an optical and/or infra-red and/or laser range finder 16; an omnidirectional radio frequency (RF) receiving antenna 14; and a directional radio frequency (RF) receiving/direction finding antenna 12. Such equipment can be mounted on separate fixtures such as mobile trailers, or on the same fixture or other structure. The outputs of these sensors are analyzed using a sensor fusion processor (described below) to detect and classify the target 44, and to determine a level of threat assessment. In some non-limiting embodiments, a human can be in the loop (HiL or "human in the loop") to render judgment; in other scenarios, the system is entirely automatic enabled by algorithms applying data mining. If the threat assessment level exceeds a certain threshold, the system can automatically deploy interdiction 10 to incapacitate or destroy the target 44. The system can therefore be instrumental in protecting critical infrastructure such as airports, bridges, power lines, factories, nuclear/power plants, shipping facilities, football stadiums, military installations, large public venues, etc., from being threatened by the target 44.

Example non-limiting embodiments provide a fully integrated multi-phenomenology detection and interdiction solution which leverages the strength of multiple individual sensor systems including but not limited to: Radar, Radio Frequency Direction Finding (DF), Electro Optical and Infra-Red (EO/IR) imagers, and Laser Range Finding (LRF), used to derive necessary location and spectral characteristics of a commercial unmanned aerial system (UAS) or drone. Unique analytic processes and algorithms use the data collected by the sensor suite to identify, classify and specify the specific waveform, pulse width, and frequency to be generated for use by an RF counter-measure, thereby exploiting inherent vulnerabilities within the onboard electronic controls of an object of interest such as a SUAS— designated as 44 in FIG. 1 small Unmanned Aerial System, usually weighing less than 20 kg or 55 lbs. The highly accurate, narrow beam RF counter-measure transmits the specifically generated RF signal, disrupting and overwhelming the subject unmanned systems control and navigation systems resulting in an airborne unmanned system landing or returning to launch location based on the subject's onboard processes.

Traditionally, air defense has been the purview of the military, not law enforcement or private security forces. However, the advent of affordable and capable SUAS, weighing less than 20 kg or 55 pounds, creates a need to detect and deter unauthorized or hostile use of this technology. Small drone systems present different detection signatures, flight characteristics and profiles, and are not likely to be detected by more conventional radar or deterred by electronic countermeasures, or kinetic systems without the risk of significant collateral damage. Existing UAS countermeasure systems are designed primarily and focus on detecting and destroying larger aircraft such as drones similar to the Iranian Ababil 3, Chinese Sky-09P and the Russian ZALA 421-08 for example. These midsize to large unmanned aerial vehicles are not likely to be used within a domestic, non-combat, environment. Due to their size and flight characteristics, detecting and tracking midsize to large military drones is accomplished with great success using traditional military radar/air defense systems designed to scan the sky. In addition, the military countermeasures used to combat UAS/UAVs against friendly positions consist of lethal offensive systems armed with deadly and destructive munitions such as bullets, artillery, electromagnetic and laser beams. Also integrated in the military countermeasures are powerful RF systems designed to disrupt, jam or spoof the SATNAV (GPS) (satellite navigation/global positioning system) signals needed for aerial navigation. This traditional approach produces a high risk of collateral damage or negative navigation effects on all GPS receivers operating in the area. The system of the non-limiting embodiments(s) resolves these negative or collateral effects by offering a precise and tailored application of the specific RF emission needed to remotely control these small commercial drones without specifically targeting the SATNAV (GPS) signal.

Military UAS countermeasures are designed and used in a battlefield or hostile environment. Using a military solution within a civilian or commercial environment would not be suitable or permissible due to the inherent liabilities and government regulations. Furthermore, the use of SATNAV/GPS jamming and spoofing can severely disrupt broad military and civilian activities such as cell phone towers and aviation navigation making it illegal outside of a military operation or combat zone. Another issue with using current military UAS/UAV countermeasures against commercial drones is the military focus on traditional force protection and counter battery missions using battlefield radar systems that are not designed for or capable of detecting slow moving targets that operate at relatively low angles or altitudes above buildings, trees and just above the horizon. Using countermeasure systems that rely only on aircraft detecting radar and GPS jamming/spoofing systems does not provide a viable defensive solution to commercially available SUAS. The full military approach to UAS countermeasure system has several drawbacks with its use in a civilian or commercial environment that includes cost, weight, size, power consumption and collateral effects using high-powered RF jamming or kinetic technologies. This gap between the military and civilian operational environment demands that an integrated, multi-sensor counter SUAS system be developed. The demand for a successful counter SUAS system that detects, tracks, identifies/classifies and deters against commercial drones without causing collateral damage or interference in a civilian environment is growing exponentially and is directly applicable to other unmanned systems employing similar technology.

The exemplary non-limiting implementations herein alleviate the problems noted with the military counter UAS systems and provide a novel, efficient and effective integrated detection, tracking, identifying/classifying and countermeasure solution against small unmanned aerial systems (SUAS) operating in a commercial or civilian environment. The implementations herein further offer increased awareness, security, privacy, and protection from the threats involving small unmanned aerial systems/vehicles, (SUAS/UAV) or other similar manned systems-such as ultra-light aircraft, and is applicable to governmental, military, commercial, private, and public concerns. Example embodiments herein provide Counter Unmanned Aerial Systems of Systems (CUASs2) to detect, identify/classify, track and deter or interdict small unmanned aerial vehicles or systems The example non-limiting systems disclosed herein provide an integrated solution providing protection from ground level to several thousand feet above ground level and laterally several miles comprising components using in part: some existing technologies for a new use; multiplexing hardware components designed for this application; development of the integrating sophisticated built-in software algorithms which calculates the exact X, Y, Z (Longitude, Latitude and Altitude) coordinates of the subject sUAS; subject SUAS RF signal analysis to determine the most appropriate RF signal characteristics required to affect the subject SUAS; video/photo analytics to identify/classify SUAS type and threat assessment, precision alignment of high definition electro-optical (EO) sensors and infrared (IR) sensors and image recognition algorithms; a Laser Range Finder (LRF) capable of tracking multiple targets, providing X, Y, Z coordinate data, heads-up display data and a fire-control capability. Such capability allows for operation in a completely autonomous manner or in a supervised manner by providing a system operator, also known as a Human-in-the loop (HiL), a real-time imagery and data to assist in picture compilation and threat assessment as well a visual display of the suspect sUAS location and image, thus, providing positive confirmation that the targeted SUAS/UAV is in violation of airspace authorization, presents a physical threat to an area of concern or has entered a designated protected area.

Operating a counter SUAS system within a civilian or commercial environment will mandate precision countermeasures to ensure very minimal to zero collateral damage or exposure to areas surrounding the targeted SUAS. The non-limiting embodiments(s) unique capability is the way it integrates multiple sensors to detect, track, identify/classify and deter SUAS/UAV systems. In addition, the system utilizes three independent sources to acquire the X, Y and Z coordinate data needed to automatically direct and align the automatic antenna alignment system and provide the initial targeting/tracking data to the EO/IR system (16) and the countermeasure system (10). The three independent sources are the radar system (43), the DF system (14) and the combined EO/IR & LRF system (16). Combining the independent X, Y, and Z coordinate data of each system will provide a precise 8-digit GPS geo-location/tracking to use in the geo-location, mapping, aiming and tracking systems. It should be noted that the military systems rely only on radar for GPS location when tracking a suspected airborne target or UAV.

The example non-limiting technology herein utilizes radar in the X-Band frequency range as one of the sensors to detect, track and classify a commercial SUAS/UAV. The unique application of radar more typically used to detect ground targets allows greater discrimination between the suspect sUAS and the highly cluttered, low altitude environment. Military air defense radars are optimized for much higher altitude and velocity targets utilizing the K and Ka bands. Existing art approaches the technical challenge of SUAS detection like any other aerial target while the non-limiting embodiments(s) described approaches this challenge as if it were a ground target. This fundamentally different approach provides a novel and unique solution for the detection of airborne SUAS or similar signature systems. Due to the high frequency, range, power, and other optimized characteristics, typical applications of aircraft detection radars are more susceptible to distortion when viewing ground-associated objects that is then classified as "Clutter".

The example non-limiting technology herein utilizes a Laser Range Finder (LRF) coupled with an Electrical Optic and Infra-Red (EO/IR) camera system as one of the sensors to detect, track, and identify/classify a commercial SUAS/UAV. The EO/IR & LRF system (16) receives its initial target data (location) from the radar system (43). The X, Y and Z coordinate data from the radar aligns the EO/IR camera and LRF towards the suspect sUAS target. The LRF is a comprehensive, multi-purpose targeting system that incorporates the same tracking and fire-control capabilities found in advanced military weapon systems including fighter aircraft, armored vehicles, and precision-guided munitions. The LRF combined with the EO/IR camera system provides the digital display to the system operator, (HIL), that shows the field of view and displays the suspect sUAS target(s) along with vital pieces of data including range-to-target, target velocity, deterrent angle, compass heading, wind velocity and direction, deterrent zone size, countermeasure type, temperature, barometric pressure and time of day. Fire control technology is at the core of the LRF and ensures extreme accuracies at long distances with slow to fast moving sUAS targets. It is what allows the non-limiting embodiments(s) to execute precision countermeasures within a controlled civilian or commercial environment. Fire control systems are basically computers that guide the release of the chosen countermeasure. Once the suspect SUAS is tagged the LRF produces an X, Y and Z data point that is sent to the countermeasure system (14) for automatic alignment of the destructive or non-destructive deterrent element (10), (RF, Laser, Impulse, Munitions, etc.). This is a significant advantage over current military systems for providing the necessary steps for increased safety when operating in a civilian/commercial environment. During the time that the suspect sUAS is being viewed through the EO/IR camera system, data mining techniques based on internal and external databases are used to compare the images and heat signatures with known SUAS images and heat signatures for possible type identification/classification and threat assessment. Video/photo analytics are used to determine the type of SUAS and if the suspect sUAS contains a payload.

The example non-limiting technology herein utilizes components of the LRF to connect the tracking EO/IR optic with the fire control trigger. Targeting technology lets you designate an exact sUAS target(s) by placing the aligned reticle on the SUAS and then pressing the tag button. When you tag a target, the tracking optic then knows what you want to engage. The optic and trigger collaborate to precisely release your chosen countermeasure. Once the decision has been made to engage the target SUAS, the tracking system then guides the fire control trigger to release the countermeasure at the exact moment needed to affect your target with minimal collateral damage to areas surrounding the target SUAS. The connection between the tracking optic and the fire control trigger contains dozens of microprocessors and electronic, electro-optic, and electro-mechanical components. When the system engages the fire control triggering mechanism, the image is compared to the original selected image, again using processes based on data mining techniques. If the two images are not perfectly aligned with the designated or tagged point, the tracking optic interrupts the triggering signal and prevents transmission of the tailored RF interdiction signal. At the time when the images are aligned and matched, the interrupt is released allowing the transmission of the desired interdiction transmission. As soon the system intersects the designation point, the fire control trigger is released executing a perfectly aimed deterrent countermeasure. This automated fire control system virtually eliminates human error caused by misaiming, mistiming, system movement, vibration or other environmental factors.

One example non-limiting technology herein utilizes Radio Frequency (RF) and Direction Finding (DF) technology to detect, and track, identify/classify a commercial SUAS/UAV. The system uses a very sensitive RF receiver scanning the area of interest, in a 360-degree manner, for any RF signal commonly used as the communication link between the operator and the SUAS. Filters within the signal processor eliminate those signatures that are not found within the population of the commercially available SUAS market. Observed signal characteristics are compared to a library or database of modulation, frequency, pulse-width and duration characteristics to identify known commercial sUAS. When an observed signal matches or is statistically similar to an expected SUAS RF signature, the azimuth of the suspect sUAS is passed to the other sensor systems for closer attention. The high gain antenna is also directed to that azimuth further refining the azimuth and elevation of the suspect SUAS. This system sensor element allows the non-limiting embodiments(s) to operate passively when required.

The example non-limiting technology herein utilizes a deterrent element to deter, suppress, control or destroy if operated in an applicable environment an unmanned system. Additional deterrent values include the ability of the systems detect function to locate and track low flying airborne threats that are not sUAS/UAV in nature. Any future technology will by matter of physics present a variety of signatures which are observable by the non-limiting embodiments(s) fused set of sensor phenomenology's, even though they may avoid detection by conventional air defense systems. In addition, should the FAA (Federal Aviation Authority) mandate future transponder identification processes on commercial SUAS/UAV; the non-limiting embodiments(s) RF/DF system is designed to accept state data generated by non-organic sensors and will incorporate this "told-in" data into the target identification process and algorithms.

As stated above, the example non-limiting technology herein is designed to accept but does not require; subject SUAS location, classification, or other state data generated by non-organic sensors. The integration of these components via the herein disclosed mechanism, is a novel combination of software and hardware, not related to existing art in purpose, is non-obvious, and provides a useful solution to uninvited, invasive and potentially hazardous commercial sUAS/UAV operations regarding privacy, security, illegal activity and terrorist threats from commercial unmanned aerial vehicles. The individual elements of the non-limiting embodiments(s) are linked via secure internal control networks and can use existing communications infrastructure or dedicated high bandwidth point-to-point communications hardware to operate the entire system remotely or add additional sensors from remote sources.

The system of the example non-limiting technology herein provides an integrated multi-sensor system that can be deployed as a "permanent placement" or as a mobile system on land, sea, or air platform.

The system of the example non-limiting technology herein may be strategically deployed to monitor the airspace around a protected interest such as a property, place, event or very important person (VIP) offering 360-degree azimuth coverage extending from the receiving antennae of the system out to a lateral distance of about 2 kilometers (6560 feet) and within the lateral boundaries up to an altitude of about 1.5 kilometers (4920 feet) above ground level (AGL). These distances are averaged and may increase through the natural progression when incorporating future technologies and optional embodiments. The area within the detection boundaries is considered to be a designated protected area. A protected area is identified, outlined and overlaid on the system mapping display and can be viewed remotely and monitored by the system operator/HiL.

The deterrent system, 102, transmitted RF frequency power is variable based on range and observed effect on the subject SUAS control system. The highly focused RF beam minimizes collateral effects on non-target receivers.

A multi-sensor system for providing integrated detection, tracking, identify/classification and countermeasures against commercial unmanned aerial vehicles weighing less than 20 kg or 55 pounds may comprise:

(a) a direction finding high fidelity RF receiver coupled with a receiving omnidirectional antenna and a receiving directional antenna for detecting an RF signature of a flying unmanned aerial vehicle, and a spectral signal identifier processor for analyzing the RF signature for identifying a set of spectral signatures of the unmanned aerial vehicle and eliminate electromagnetic clutter present in the typical UAS RF spectrum;

(b) a modified radar system originally intended for detection of terrestrial (Surface) targets, provided with a radar clutter and target filter processor for providing input to an azimuth and elevation vector coordinate data processor for determining the location of the unmanned aerial vehicle; and (c) a signal generator that produces at least one tailored signal based on the spectral signatures of the unmanned aerial vehicle and a variable strength amplifier that generates an output power, an antenna alignment assembly for adjusting the alignment of a transmitting directional and focused antenna based on the location of the unmanned aerial vehicle as determined by the azimuth and elevation vector coordinate data processor, the signal generator and amplifier coupled with the transmitting antenna to send at least one signal to the unmanned aerial vehicle to alter at least one of the speed, direction and altitude of the unmanned aerial vehicle.

The system for providing integrated detection and countermeasures against unmanned aerial vehicles may further comprise: a Multiband LNA Assembly for amplifying received signals from the receiving omnidirectional and receiving directional antennae and transmitting signals to an Uplink Receive Host Workstation that sends information to the spectral signal identifier processor where the type of unmanned aerial vehicle is identified using a database of known spectral signal wave information for known unmanned aerial vehicles, and a Frequency and Wave Form Parameters unit coupled to a Modulation Look Up Table coupled to an ECM Modulation Type Select unit that is coupled to the signal generator that produces at least one tailored signal which is then transmitted in a highly focused and variable strength beam precisely aimed at the subject unmanned aerial system.

The system for providing integrated detection and countermeasures against unmanned aerial vehicles may further comprise a Receive Blanking unit that forces the receiving omnidirectional and a receiving directional antenna to stop receiving a radio frequency being transmitted by the transmitting directional and focused antennae.

The system for providing integrated detection and countermeasures against unmanned aerial vehicles may further provide an azimuth and elevation vector coordinate data processor that uses a spherical coordinate system for three-dimensional space wherein three numbers specify the position of a point measured in latitude, longitude and elevation obtained from the radar.

The system for providing integrated detection and countermeasures against unmanned aerial vehicles may further comprise a laser range finder and wherein the azimuth and elevation vector coordinate data processor uses a spherical coordinate system for three-dimensional space wherein three numbers specify the position of a point measured in latitude, longitude and elevation obtained from the laser range finder and associated computational algorithms.

The system for providing integrated detection and countermeasures against unmanned aerial vehicles may further comprise Electro-Optical and Infrared Sensors and associated computational algorithms and co-located with a Laser Range Finder to provide a comprehensive, multi-purpose targeting system that incorporates a fire-control capability and digital display to the system operator/HIL that shows the field of view of the suspect UAS target(s) along with vital pieces of data including range-to-target, target velocity, elevation, azimuth, wind velocity and direction, deterrent zone size, countermeasure type, temperature, barometric pressure and time of day.

The system for providing integrated detection and countermeasures against unmanned aerial vehicles may employ at least one tailored signal produced by the signal generator that is an electronic counter measure either specifically calculated or selected using modulation lookup table to determine a broad range of RF signatures used by the flying unmanned aerial vehicle utilizing a database library of specific radio frequencies characteristics common to unmanned aerial vehicles The system for providing integrated detection and countermeasures against unmanned aerial vehicles may further employ at least one tailored signal produced by the signal generator is an electronic counter measure either specifically calculated or selected using modulation lookup table to determine a broad range of RF signatures used by the flying unmanned aerial vehicle utilizing a database library of specific radio frequencies characteristics common to unmanned aerial vehicles, is augmented by the observed frequencies detected by the RF detection.

The system for providing integrated detection and countermeasures against unmanned aerial vehicles may further employ at least one tailored signal produced by the signal generator that is an electronic counter measure either specifically calculated or selected using modulation lookup table to determine a broad range of RF signatures used by the flying unmanned aerial vehicle utilizing a database library of specific radio frequencies characteristics common to unmanned aerial vehicles this tailored signal may vary from the received signal in that a harmonic of the received signal may prove more effective in deterring the suspect UAV than the actual received signal.

The system for providing integrated detection and countermeasures against unmanned aerial vehicles may further employ at least one tailored signal produced by the signal generator that is an electronic counter measure either specifically calculated or selected using modulation lookup table to determine a broad range of RF signatures used by the flying unmanned aerial vehicle utilizing a database library of specific radio frequencies characteristics common to unmanned aerial vehicles, use of the frequency harmonic will allow reduced transmit power and minimize unintended collateral effects.

The system for providing integrated detection and countermeasures against unmanned aerial vehicles may further employ a transmitting directional and focused antenna that is a component of a directional transmitting antenna array.

The system for providing integrated detection and countermeasures against unmanned aerial vehicles may further employ a capability to engage an airborne UAS/UAV in either a destructive (kinetic) or a non-destructive (non-kinetic) manner.

The system for providing integrated detection and countermeasures against unmanned aerial vehicles may further comprise a means to accept non-system generated suspect sUAS identification and location information received from outside sources and to detect and track traditional commercial SUAS/UAV containing or not containing electronic transponder identification technology and a means to detect and track non-traditional aerial systems (Manned or unmanned) with similar spectral signatures operating in similar low altitude environments.

The system for providing integrated detection and countermeasures against unmanned aerial vehicles may further comprise a secure control network (using existing infrastructure or dedicated high bandwidth point-to-point communications hardware) that allows non-collocated emplacement of system elements 102 (FIG. 2), 103 (FIG. 3) and 104 & 105 (FIG. 4) to provide control of the system from remote locations or add additional sensors from remote sources.

More Detailed Non-Limiting Example Embodiments

Figure 1A:
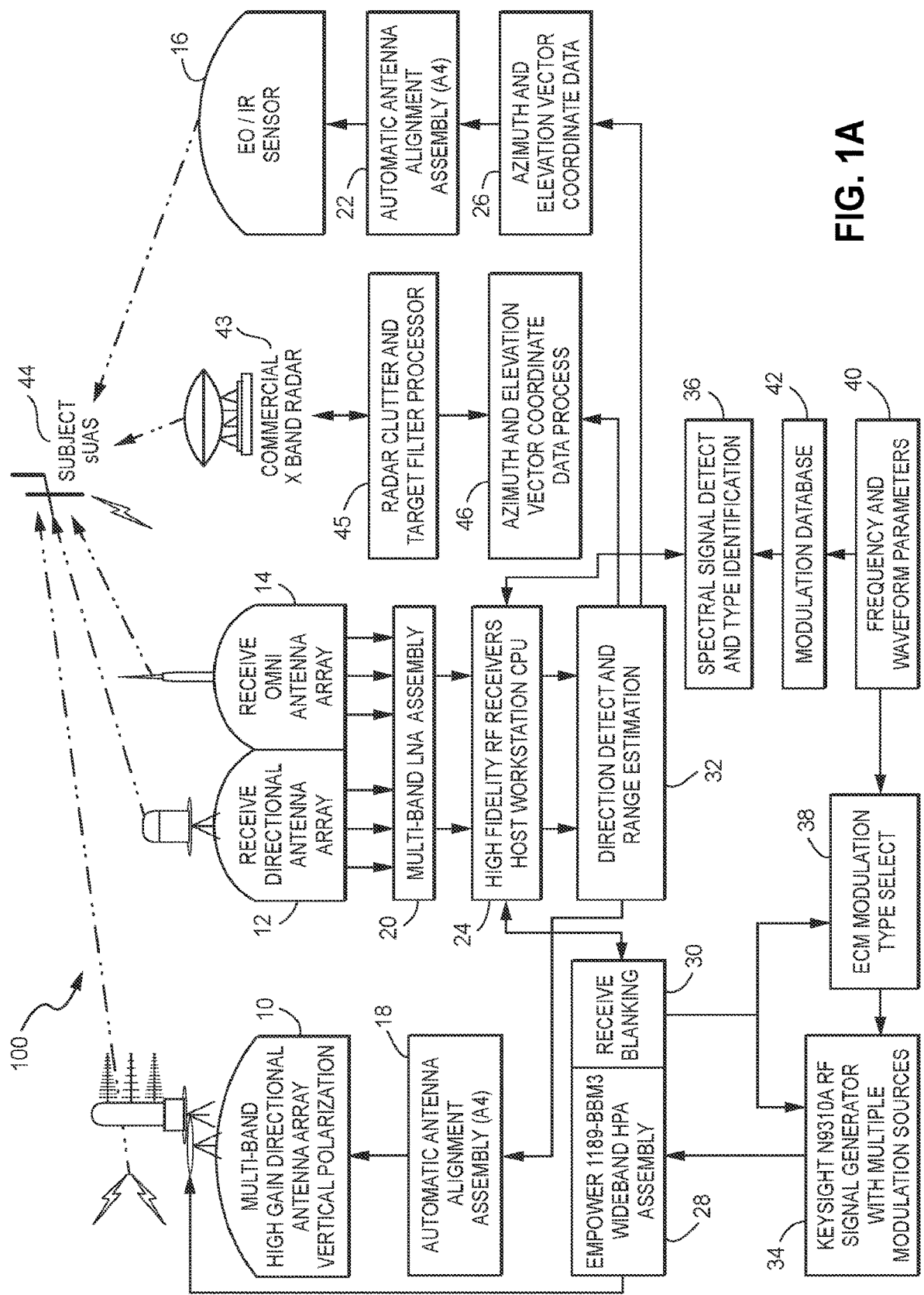
FIG. 1A is a schematic representation of the components and function of an example non-limiting integrated detection and countermeasure system for use against small-unmanned aerial systems (sUAS).

Referring to FIGS. 1A-4 there are shown schematic representations of the components of an integrated detection, tracking, identification/classification and countermeasure system 100 for use against small unmanned aerial systems (SUAS) 44. In particular, FIG. 1A shows an example non-limiting embodiment of an overall system 100.

Figure 2:
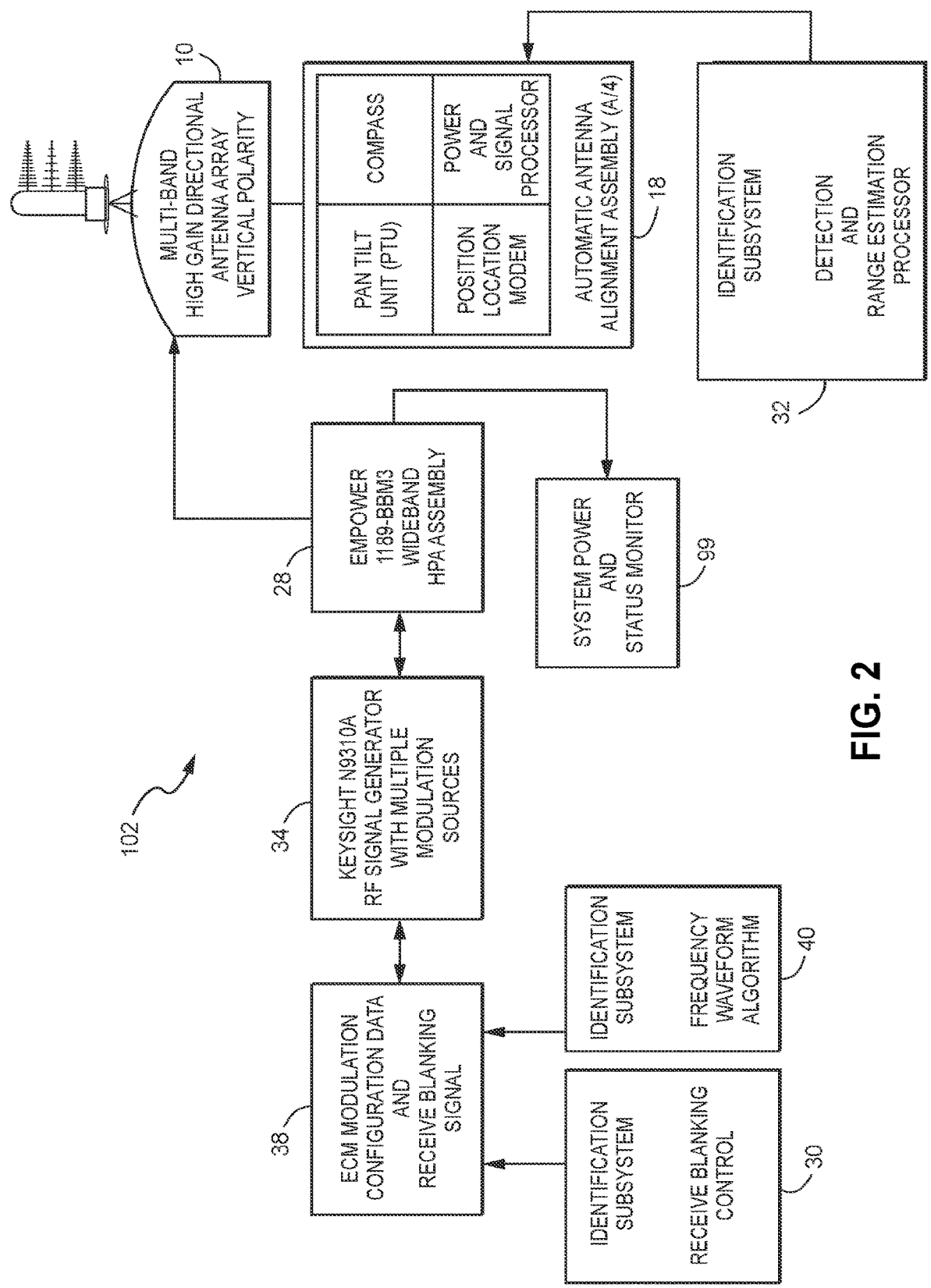
FIG. 2 is a schematic representation of the deterrent and countermeasure system for use against small unmanned aerial systems (SUAS), 44 of FIG. 1A.

In FIG. 1A, a multiband high gain directional antenna array with vertical polarization transmits multiband high gain RF signals. Matrix Directional Transmit Antenna Array—designated as 10 in FIGS. 1A and 2, is a signal processing technique used in sensor (Antenna) arrays for directional signal transmission; this is achieved by combining elements in a phased array in such a way that signals at particular angles experience constructive interference while others experience destructive interference; this equipment can be purchased "Off-The-Shelf" and one common manufacturer of this type of equipment is Motorola. Directional Antenna—designated as 10 in FIGS. 1A and 2, and 12 in FIGS. 1A and 3, may comprise in one non-limiting embodiment a 1 of directional or beam antenna that radiates greater power in one or more directions allowing for increased performance on transmits and receives and reduced interference from unwanted sources. These transmitted RF signals are specifically generated to interrupt or "spoof" the UAS/UAV on-board receivers or any other destructive/non-destructive deterrent.

A receive omnidirectional antenna array 12 is used to refine the inbound azimuth of the suspect SUAS 44 and can produce an X, Y coordinate when the RF signal is detected by more than one RF receiver being utilized with the system. Receive Directional Antenna Array—designated as 12 in FIGS. 1A and 3, refers to multiple receiving antennae arranged such that the superposition of the electromagnetic waves is a predictable electromagnetic field and that the currents running through them are of different amplitudes and phases; this equipment can be purchased "Off-The-Shelf" and one common manufacturer of this type of equipment is Motorola and WINRADIO.

A receive omnidirectional antenna array 14 provides 360° alerting and cueing data which allows the directional antenna 12 to be precisely aimed at the suspect sUAS 44. Omni-directional Antenna—designated as 14 in FIGS. 1A and 3, may comprise a class of antenna which receives or transmits radio wave power uniformly in all directions in one plane, with the radiated power decreasing with elevation angle above or below the plane, dropping to zero on the antenna's axis. Receive Omni Antenna Array—designated as 14 in FIGS. 1A and 3, may comprise a class of antenna that receives radio wave power uniformly in all directions in one plane; this equipment can be purchased "Off-The-Shelf" and one common manufacturer of this type of equipment is Motorola.

Figure 4:
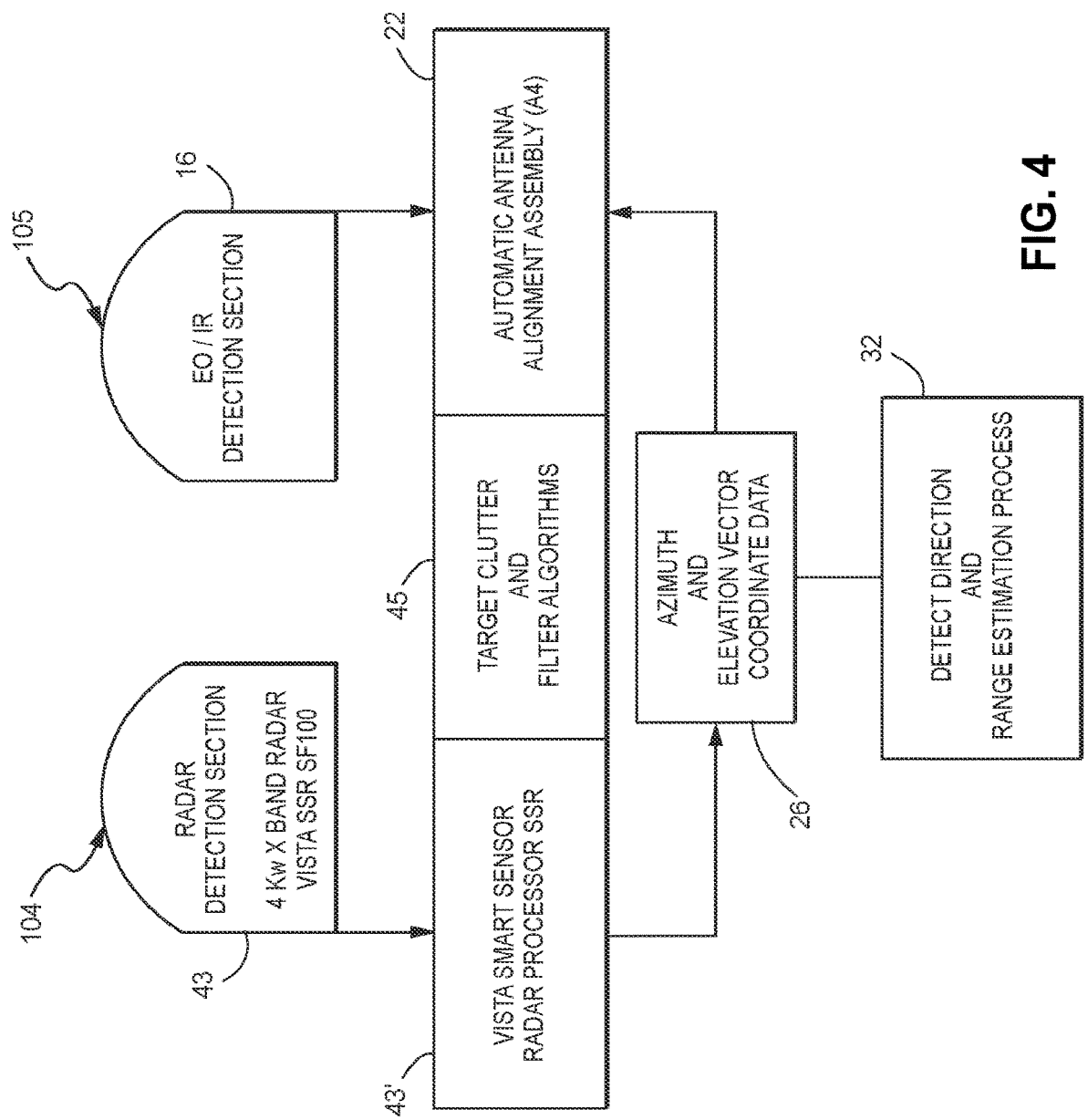
FIG. 4 is a schematic representation of the Radar detection system and Electro Optical/Infer Red (EO/IR) camera & Laser Range Finder (LRF) system for use against small unmanned aerial systems (SUAS), 44 of FIG. 1A.

EO/IR sensor 16 (electro-optical and/or infrared) may be collocated with LRF (laser range finder) with target acquisition and fire control system. Electro-Optical and Infrared Sensors—designated as 16 in FIGS. 1A and 4, is a combination of a standard high definition video camera capable of viewing in daylight conditions and an infrared video camera capable of viewing in the infrared light perspective; both camera systems can be purchased "Off-The-Shelf" as common technology, one common manufacturer of this type of camera systems is FLIR Systems. IR—infrared is invisible (to the human eye) radiant energy, electromagnetic radiation with longer wavelengths than those of visible light, extending from the nominal red edge of the visible spectrum at 700 nanometers (frequency 430 THz) to 1 mm (300 GHz). Laser Range Finder—designated as 16 in FIGS. 1A and 4, is a rangefinder which uses a laser beam, usually pulsed, to determine vital pieces of data including range-to-target, target velocity, deterrent angle, compass heading, wind velocity and direction, deterrent zone size, countermeasure type, temperature, barometric pressure and time of day. This equipment can be purchased "Off-The-Shelf" and one common manufacturer of this type of equipment is TrackingPoint. This LRF-sensor arrangement 16 provides images for recognition of a suspect SUAS 44. LRF sensor arrangement 16 may also provide an X, Y, Z coordinate for the target 44 that is detected.

An automatic antenna alignment assembly 18 provides precision antenna alignment based on the X, Y, Z data produced by a radar system 43 and LRF system 16, for both the interdiction and directional antennas. Automatic Antenna Alignment Assembly—designated as 18 in FIGS. 1A, 2 and 3, and as 22 in FIGS. 1A and 4, is specialized electronic equipment specifically designed to automatically point the directional antennae and or camera, laser systems to the desired location, namely a small unmanned aerial vehicles/ systems (SUAS) designated as a target 44 in FIG. 1A, based on longitude and or latitude information gained or received by the receiving antennae, designated as 12 and 14 in FIGS. 1A and 3, and or radar antennae designated as 43 in FIGS. 1A and 4; this specialized equipment can be purchased from and is proprietary to enrGies Engineering located in Huntsville, Alabama.

Figure 3:
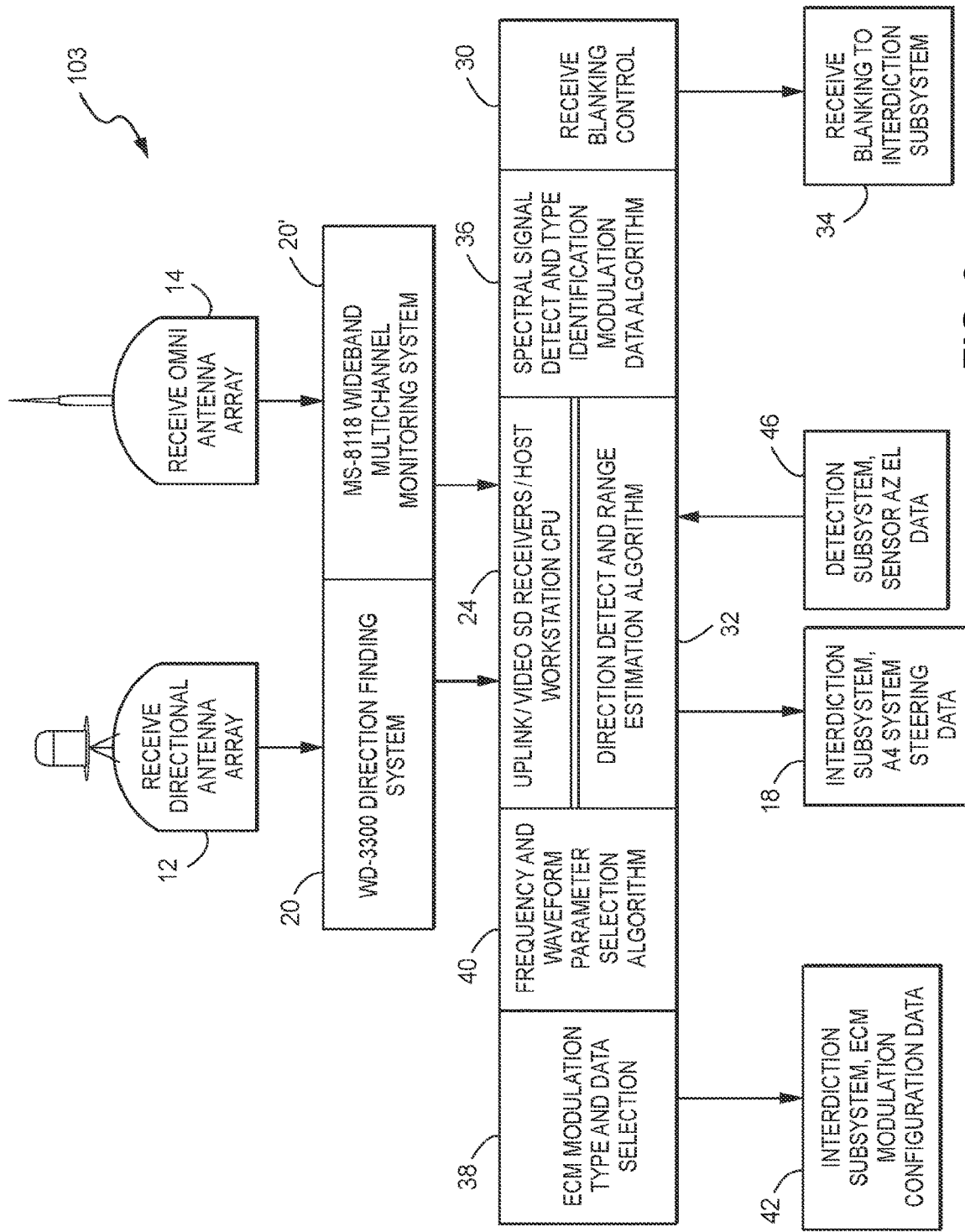
FIG. 3 is a schematic representation of the Radio Frequency (RF) detection system for use against small unmanned aerial systems (SUAS), 44 of FIG. 1A.

A multiband LNA (low noise amplifier) assembly 20 amplifies the low power waveform received by antennas 12, 14 for use by other processing functions. Multiband Low Noise Amplifier (LNA) Assembly—designated as 20 in FIGS. 1A and 3, is a multi-radio frequency electronic amplifier used to amplify possibly very weak signals, for example captured by an antenna.

An automatic antenna alignment assembly 22 similarly provides precision antenna alignment based on the X, Y, Z data produced by the radar system 43 for the LRF subsystem and the EO/IR sensor 16.

High fidelity RF receivers are coupled to a host workstation CPU 24. CPU 24 executes control signal processing algorithms based on software instructions stored in non-transitory memory. Uplink/Video Standard Definition (SD) Receiver & Host Workstation—designated as 24 in FIGS. 1A and 3, is a connection from the antennae to the video encoder where the information is processed by the main computer network; the uplink equipment can be purchased "Off-The-Shelf" and one common manufacturer of this type of equipment is Cisco Systems; the video receiver and main computer is also "Off-The-Shelf" technology and are readily available from numerous manufacturers.

An azimuth and elevation vector coordinate data processor 26 is used to calculate azimuth and elevation of target 44. Azimuth and Elevation Vector Coordinate Data—designated as 26 in FIGS. 1A and 4, is specialized algorithm software that has been developed to be used with a spherical coordinate system for three-dimensional space where three numbers specify the position of a point measured in latitude, longitude and elevation obtained from the LRF & EO/IR Sensors designated as 16 in FIGS. 1A and 4 that includes a Laser Range Finder, and/or Radar designated as 43 in FIGS. 1A and 4.

Uplink Video/Radio Transmitter Assembly—designated as 28 in FIGS. 1A and 2, is a device that will take the received radio or video frequency information from database libraries designated as 36 in FIGS. 1 and 3, 40 in FIGS. 1A-3, and 42 in FIGS. 1A and 3 and send it through a radio amplifier designated as 34 in FIGS. 1A—3 to a transmitting directional antenna or matrix directional transmit antenna array designated as 10 in FIGS. 1A and 2; this equipment can be purchased "Off-The-Shelf" and one common manufacturer of this type of equipment is Motorola.

An Empower 1189-BVM3 wideband HPA assembly with a receive blanking unit 30 is provided. Blanking—designated as 30 in FIGS. 1A, 2 and 3 is the time between the last radio transmitting signal and the beginning of the next radio transmitting signal. Receive Blanking—designated as 30 in FIG. 1A—3, is specialized algorithm software that has been developed to stop the receiving antennae, designated as 12 and 14 in FIGS. 1A and 3, from receiving radio frequency signals during the time that the counter measure transmitting frequency, designated as 34 in FIGS. 1A-3, is being transmitted by directional transmitting antennae, designated as 10 in FIGS. 1A and 2, for the purpose of deterrence or interdiction of the suspect unmanned aerial vehicle/system, designated as a target 44 in FIG. 1A, identified as a known threat.

A sensor fusion processor 32 includes a direction detect and range estimator that estimates direction and range of target 44 based upon inputs received from the radar 43 and the LRF 16. Direction Detection and Range Estimation—designated as 32 in FIGS. 1A-4, is specialized algorithm software that has been developed to detect a suspected target or signal of interest and calculated to obtain the azimuth and distance to that target or signal of interest based on data obtained by the Radio Frequency (RF) detection section 103 in FIG. 3, the Radar detection section 104 in FIG. 4, and the Electro Optical/Infrared (EO/IR,) (16) and co-located LRF (Laser Range Finder) (16) detection section 105 in FIG. 4. DF—designated as 12 in FIGS. 1A and 3, Direction Finding refers to the measurement of the direction from which a received signal was transmitted; this can refer to radio or other forms of wireless communication. Sensor Fusion Processor—Designated as number 32 in FIGS. 1A, 2, 3, and 4 is a control system processor which integrates the discrete data from all inputting sensors—This set of algorithms and processes provides the Human in the Loop (HiL) a visual display of subject location and type classification, as well as EO/IR imagery; overlaid on a moving map display; and includes the interdict command logic. These control functions are available via a service on our system secure internal network.

A Keysight N9310A RF signal generator with multiple modulation sources is coupled to an ECM modulation type selector 38. Electronic Counter Measure (ECM) Modulation Type Select—designated as 38 in FIGS. 1A-3 is specialized algorithm software that has been developed to help narrow down the radio frequency identified by a modulation lookup table of the specific unmanned aerial vehicle/system of interest, designated as a target 44 in FIG. 1A, utilizing a database library that was created and categorized with the specific radio frequencies common to all unmanned aerial vehicles/systems. A Spectral Signal Detect and Type Identifier 36 contains an RF library in databases of current, previously stored and new wave forms and frequencies of SUAS 44. Spectral Signal—designated as 36 in FIGS. 1A and 3, the frequency spectrum of a time-domain signal is a representation of that signal in the frequency domain. Spectral Signal Detection and Type Identification—designated as 36 in FIGS. 1A and 3, is specialized algorithm software that has been developed to detect and identify unmanned aerial vehicles/systems utilizing a database library that was created and categorized with the spectral signatures common to all unmanned aerial vehicles/systems.

A frequency and waveform parameter generator 40 is used to specify frequency and waveform parameters for transmission. Frequency and Waveform Parameters—designated as 40 in FIGS. 1A-3, Is specialized algorithm software that has been developed to identify unmanned aerial vehicles/systems utilizing a database library that was created and categorized with the specific radio frequency waveform common to all unmanned aerial vehicles/systems.

FIG. 2 shows a countermeasure and deterrent section couple to the multiband high gain directional antenna array 10. In this example, an automatic antenna alignment assembly 18 may be mechanically and/or electrically coupled to the antenna array 10 to set and change the azimuth and elevation of the antenna. As shown in FIG. 2, the automatic antenna alignment assembly 18 may include various components including a pan/tilt unit (PTU) 18a, a magnetic compass 18*b*, a position location modem 18*c*, and a power and signal processor 18*d*. The automatic antenna alignment assembly 18 is controlled by the sensor fusion processor/identification subsystem 32 including a detection and range estimation processor. The detection range estimation processor uses received sensor signals to identify potential targets 44, and then controls the automatic antenna alignment assembly 18 to move and/or reconfigure the multiband high gain directional antenna array in order to beam transmission signals at the target. A multiband antenna array 10 receives signals to transmit from the Empower 1189-BVM3 wideband HPA assembly, which is coupled to a system power and system monitor 99. The Empower unit 28 interacts with a Keysight N9310A RF signal generator with multiple modulation sources 34, thereby generating particular signals with particular modulation superimposed thereon for transmission by antenna array 10.

ECM modulation configuration data and receive blanking signal unit 30 interacts with the Keysight unit 34. Modulation Function Generation—designated as 34 in FIGS. 1A-3, Is specialized algorithm software that has been developed to transmit (Jam) a specific radio frequency, designated by 38 in FIG. 1A—3 and 42 in FIGS. 1A and 3, which is unique to a specific unmanned aerial vehicles/systems utilizing a database library that was created and categorized with the specific radio frequencies used on all common unmanned aerial vehicles/systems. The ECM modulation configuration data unit 38 in turn receives input signals from the identification subsystems 30, 40. Modulation Lookup Table—designated as 42 in FIGS. 1A and 3, is specialized algorithm software that has been developed to identify the broad range of radio frequencies being used by a specific unmanned aerial vehicle/system of interest, designated as a target 44 in FIG. 1A, utilizing a database library that was created and categorized with the specific radio frequencies common to all unmanned aerial vehicles/systems. Identification subsystem 30 uses receive blanking control, whereas the identification subsystem 40 uses frequency waveform algorithms.

FIG. 3 shows the example non-limiting radio frequency detection section 103. In this example, the received directional antenna array 12 provides its received signal output to a WD-3300 direction finding system 20. The RF receiving omnidirectional antenna 14 provides its received signals to an MS-811A wideband multichannel monitoring system 20'. These receivers provide modulated signals to the uplink/video SD receivers/host work station/CPU 24 that executes direction detect and range estimation algorithms under software instruction control stored in non-transitory memory (sometimes with humans in the loop). The CPU 24 operates in conjunction with ECM modulation type and data selection 38 and frequency and waveform parameter selection algorithm 40. A spectral signal detected type identification modulation data algorithm 36 and receive blanking control 30 also operates in conjunction with CPU 24. Receive blanking control 30 provides its receive blanking output to the interdictions subsystem 34. The ECM modulation type and data selection 38 similarly provides its output to an interdiction subsystem 42 based upon ECM modulation and configuration data. The CPU 34 provides an output to an interdiction subsystem A4 system with steering data 18, and receives inputs from the detection subsystem sensor azimuth and elevation data 46.

FIG. 4 shows an example non-limiting radar detection section 104 and EO/IR/LRF detection section 105. In this example, the radar detection section 104 includes, for example, an X-band radar such as a Vista Smart Sensor SSSR 43. The power output of the X-band radar transceiver will be selected for desired range. The Vista smart sensor radar processor SSSR 33' coupled to the radar detection section 43 may provide azimuth and elevation vector coordinate data to unit 26. Target clutter and filter algorithms 45 may be used and/or executed by the Vista smart sensor radar processor SSSR 43'. The EO/IR/LRF detection section 16 may provide its output as explained above to an automatic antenna alignment assembly 22. The automatic antenna alignment assembly 22 may be informed by the azimuth and elevation vector coordinate data 26. The azimuth and elevation vector coordinate data 26 may operate in cooperation with a detect direction and range estimation process the sensor fusion processor 32 implements. STC—Slew To Cue, the autonomous actions of electronic, radio or optical sensors to rotate using an automatic antenna alignment assembly designated as 18 in FIGS. 1A-3, and 22 in FIGS. 1A and 4 to move and point cameras 16 in FIGS. 1A and 4 and countermeasures 10 in FIGS. 1A and 2 in the direction of a suspect target 44 in FIG. 1A, based on input from data processed by components 26 in FIGS. 1A and 4, and 46 in FIGS. 1A, 3 and 4, thus, keeping the "cued" targets in view at all times with or without human intervention.

Figure 5:
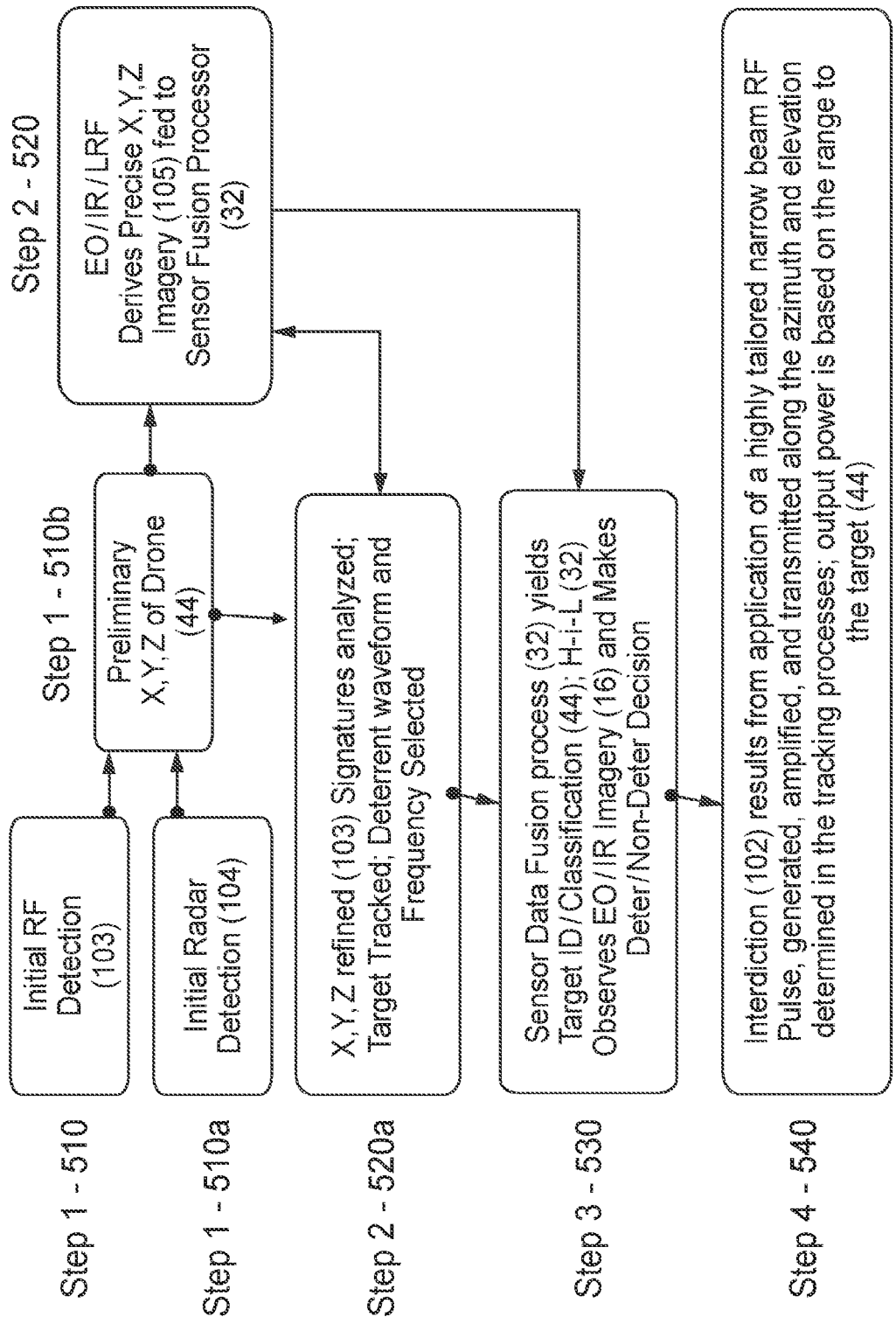
FIG. 5 is a simplified flow-chart showing computational processes and functions that locate, identify/classify, track and deter a small unmanned aerial system (SUAS), 44 of FIG. 1A in an automated manner.

FIG. 5 shows an example non-limiting flow chart that describes operation of the embodiment shown in FIGS. 1A-4. Upon initial RF detection of a target 44 (block 510), and/or initial radar detection block 510*a*, the system may process these signals to identify a preliminary position (X, Y, Z) of the target (block 510*b*). The optical/IR/laser range finder may be used to derive a more precise X, Y, Z location, and imagery is fed to the sensor fusion processor (block 520). The system may then refine the X, Y, and Z coordinate position of the target and analyze received signatures and then begin tracking the target (block 520*a*). The system may next select a deterrent mode form and frequency for use in interdiction (block 520*a*). The system may then use sensor data fusion to yield a target ID/classification with or without a human in the loop (block 530). HIL—Designated as part of sensor fusion processor 32 in FIGS. 1A, 2, 3 and 4 is the system control position allowing the system operator or also referred to as the Human in the Loop (HiL) the ability to monitor all system functions/displays and has the opportunity to override the automated functions of the system. The computers and/or a human in the loop may observe the EO/IR imagery and make deter/non-deter decision (block 530). If the decision is to deter, then interdiction is initiated (block 540). Such interdiction may result from the application of a highly tailored narrow beam RF pulse which is generated, amplified and transmitted along the azimuth and elevation determined in the tracking processes with power based on the range to the target (block 540).

FIG. 5 thus represents a simplified visual over-view of the system processes that occur, from start to finish, in detecting (510), tracking (520), identification/classification (530) and deterring (540) a sUAS (44).

1. A first function of the system is detecting a suspect sUAS target as reflected in sections 103-105 and 510 of FIG. 3-5.
2. The second function of the system is tracking a suspect sUAS target as reflected in sections 103-105 and 520 of FIG. 3-5.
3. The third function of the system is identifying a suspect sUAS target as reflected by sections 103-105 and 530 of FIG. 3-5.
4. The fourth function of the system is a deterrent targeting a suspect SUAS as reflected by section 102 and 540 of FIG. 3-5. This element of the system may be augmented with a destructive element consisting of a kinetic weapon system but is currently illustrated in FIG. 1A using a non-kinetic RF deterrent.

In more detail, the first function of the system is to detect the Radar and RF signatures of a suspect sUAS flying near or within the system's detection boundaries. All SUAS's have a distinct set of spectral signatures (sound, heat, radar cross section, radio frequency wave pattern) detected by a spectral signal identifier processor 36. This fact is the basis for the detection sections 103-105 of the system 100 of the non-limiting embodiments(s). Section 510 of FIG. 5, Section 104 of FIG. 4 and Section 103 of FIG. 3 of the example non-limiting technology herein are used for the detection process. This process begins with the radar 43 and/or the Receive Omni Antenna Array 14 detecting the presence of an airborne SUAS 44 within the defined area of protection. Any suspect sUAS 44 detected by the radar 43 produces radar-generated signature that is compared with known radar signatures, stored within the radar library database 43, of common SUAS systems to verify that the suspect target is a SUAS. The system of the non-limiting embodiments(s) will use a proven high-end direction finding (DF) equipment 12, 14 and a high fidelity RF receiver 24 coupled with omnidirectional and directional antennae 12 and 14 to detect the communication link between a SUAS 44 and its operator. When the DF equipment 12, 14 has detected a communication link of a SUAS within the system boundaries, the receive host workstation 24 will analyze the radio frequency wave signature and confirm that the RF detected is from a SUAS.

This identification process also applies when a radar unit 43 is integrated with the DF equipment. This element of the system may be augmented with additional signature detection elements consisting of acoustic sensors but is currently illustrated in FIG. 1A using the primary radar sensors 43, RF sensors 12, 14 and electro optical sensor 16. In addition, the RF receiver 20 scans for the presence of known C2 uplink or downlink and video uplink or downlink frequencies commonly used by SUAS and compare the received signature against known RF signatures stored within a library database 36. Successful matches generate a target file and release the X, Y, and Z coordinate data 26 and 46 of that target to the A4 units 18 & 22 to begin the process of tracking. Integrating multiple Direction Finding (DF) equipment 12, 14 to the system of the non-limiting embodiments(s) will increase the precision in obtaining the azimuth that the SUAS is flying. Integrating radar equipment 43 provided with a radar clutter and target filter processor 45, with the direction finding (DF) equipment and LRF 16 will provide the non-limiting embodiments(s) the ability to determine with greater accuracy the altitude and azimuth of the SUAS 44 at the time of discovery and during the time it remains within the systems detection boundaries.

The coordinate data obtained from DF 26, 46, radar unit 43 and LRF 16, is then sent to the direction detect and range estimation, (Sensor Fusion Processor) 32, where algorithms will be used to send SUAS location coordinates to the Automatic Antenna Alignment Assembly (A4) 22, 18. Put another way, using an enhanced analytic function commonly referred to as "Slew-To-Cue", the non-limiting embodiments(s) causes autonomously, the actions of the electronic, radio frequency sensors and/or optical sensors to rotate using the automatic antenna alignment assembly 18, 22 to move and point cameras and collocated LRF 16 with countermeasures antenna 10, in the direction of a suspect sUAS 44 based on input from data processed by the azimuth and elevation unit 26, 46, thus, keeping the "cued" targets in view at all times with or without human intervention. This information will then direct the Automatic Antenna Alignment Assembly (A4) 22 to point the Electro-Optical and Laser Range Finding unit 16 at the SUAS. This precise aiming function enables highly accurate visual and non-visual imagery to be captured of the suspect sUAS, 44. By comparison of the captured imagery against known and continuously improving profile databases maintained or accessed by sensor fusion processor 32, sophisticated pixel and histogram comparison algorithms will confirm or deny that the target being viewed is a sUAS and a threat assessment is then generated.

The detect elements operate with unique software translating discernable signatures (Radar, RF, EO/IR) into identifiable data aiding in the detection and identification/classification process. All signature data (Radar, RF & EO/IR) is then processed and coupled with the LRF 16 data to generate a reference azimuth and elevation 26, 46 of the suspect SUAS 44. The information generated by the systems detection section is then passed electronically to the direction and range estimation processor, (Sensor Fusion Processor) 32, to yield a SUAS location and overlaid on the system mapping display to be viewed by the system operator/HiL. The RF detection receiver and processors 24 determine the: radio (carrier) frequency, pulse width or pulse duration, pulse repetition interval, signal amplitude and polarization; to a lesser extent the scan pattern and rate. These characteristics are then compared within the library database 36 to the known characteristics of the most likely SUAS RF element profiles. This analytic function is performed in an automated process resident in system detect element 103.

The example non-limiting technology herein is intended to utilize all of the multi-sensors described above to obtain X, Y and Z (Longitude, Latitude and Altitude) of the suspect sUAS. Each sensor may be used independently or collectively. The Radar in FIG. 2 can be use in stand-alone mode to provide the X, Y, Z coordinates to Azimuth and Elevation Vector Coordinate Data Processor 46 and Directional Detect and Range Estimation function of sensor fusion processor 32 that enables the slew to clue (STC) to the EO/IR/LRF 16 and Receive Directional Antenna 12 and or Deterrent system Antennae 10. The RF receive antenna 12 and Omni-directional antenna 14 in FIG. 3 can also provide the X and Y coordinates in stand-alone mode to activate the Automatic Antenna Alignment Assembly 18 & 22, the Multiband High gain Directional Antenna Array 10 and EO/IR/Laser Range Finder 16 as displayed in FIGS. 1A and 2. This automated function points the directional antennae 10 and or EO/IR and Laser Range Finder 16 to the desired location based on longitude and or latitude information gained or received by the receiving antennae, designated as 12 and 14 in FIGS. 1A and 3, and or radar antennae designated as 43 in FIGS. 1A and 4. Additionally, non-system generated suspect SUAS identification and location information received from outside sources may be used in the calculation processes within the system of example non-limiting technology herein.

The example non-limiting technology herein begins calculation of the optimized waveform and necessary power and frequency to interfere with the suspect SUAS on-board electronic controls and communication links. Simultaneously, the threat assessment and SUAS identity information is made available via visual display to the system operator/HiL providing an opportunity to override the interdiction sequence of the non-limiting embodiments(s) if desired.

A second function of the system, 520 of FIG. 5, is to track a suspect sUAS that is within the system boundaries or approaching a protected area. When a suspect SUAS nears or enters the system boundaries, azimuthal data obtained by the detection sections 103, 104 and 105 is sent to the automatic antenna alignment assembly 22 and 18. Section 104 & 105 of FIG. 4 and Items 12, 14, 16, 20 & 32 of FIG. 3 of the non-limiting embodiments(s) are used for the tracking process. Coordinate data obtained by the radar 43, Omni and Directional antennas 12, 14 and the LRF 16 are sent to the Sensor Fusion Processor 32 where a set of algorithms and processes provides the System Operator/HiL a visual display of continuous suspect sUAS 44 location as well as the EO/IR imagery and threat assessment, overlaid on a moving map display and includes the interdict command logic needed in Step 4. The radar 43 will provides X, Y, Z location data and preliminary suspect sUAS identification based on the observed radar signature (cross-section, Doppler effect, polarization). The observed SUAS characteristics are compared in a signature library or database 43 of known SUAS of concern. This database is updated with observed characteristics and becomes more refined with use. These computational functions take place within 43 and are continuously refined as the suspect SUAS 44 is tracked. The system's control software/hardware provides this information to the integrated Electro-Optical (EO) and Infrared (IR) sensor 16, which autonomously centers the field of regard of the EO/IR sensor to the known location of the suspect SUAS 44.

The LRF 16, assisted by the system of software/hardware, will then determine the precise X, Y, Z coordinates (X=longitude, Y=latitude, Z=altitude) of the suspect SUAS. The azimuth, elevation and distance is obtained by the Laser Range Finder 16, and is transferred to the Azimuth and Elevation Vector Coordinate Data processor unit 26 that calculates the precise azimuth and elevation information and uses that to generate servo commands which drive the A4 system 18 controlling the Matrix Directional Transmit Antenna Array 10 via the Direction Detect and Range Estimation function of sensor fusion processor 32; to aim the associated equipment at the suspect sUAS 44. This precise location and range information is provided to the countermeasure and deterrent section 102 of the system 100. Using this data, the countermeasure and deterrent section 102 computes the RF spectral characteristics that will nullify control signals that the suspect SUAS expects to receive. A signal generator 34 produces a tailored signal and a variable strength amplifier 28 generates the output power required to cause the desired effect at the desired range to the targeted SUAS 44 as indicated within the fourth function of the system.

A third function of the system, 530 of FIG. 5, is to identify the SUAS that is approaching or within the system boundaries or protected area. Item 36 of FIG. 3, Item 43 of FIG. 4 and Item 32 of FIGS. 1A, 2, 3 and 4 of the non-limiting embodiments(s) is the identification process. This process utilizes radar data obtained by Radar 43, the RF data 36 gathered by the Receive Omni & Directional Antenna Array 14 & 12 combined with the visual and or heat signatures generated from the EO/IR camera system 16 to determine the type of SUAS and any payload the SUAS may have attached to it. This data is sent to the Sensor Fusion Processor 32 that integrates the discrete data from all inputting sensors listed above to aid in target identification and threat assessment. Further, a set of algorithms and processes continues to provide the System Operator/HiL a visual display of geo-referenced suspect sUAS 44 locations and type classification, as well as EO/IR imagery overlaid on a moving map display. These functions are described in a linear manner but are continuously updated, thereby increasing the positional and SUAS identification/threat assessment accuracy.

As this data is collected and refined, the interdiction RF waveform amplitude, pulse width and repetition frequency is also refined. The interdiction RF frequency is determined and will be a harmonic of the detected RF frequency controlling the suspect SUAS, thereby, increasing its effects on the SUAS control sensors and minimizing potential for unintended collateral effect. The system uses the hardware and software of the Radio Frequency (RF) detection section 103 and the associated known and observed communication radio frequencies signatures exhibited between the SUAS and its controlling operator, to include video data exchange, and compares it against the stored data (RF Database 42) of known SUAS control/video frequencies. The system also analyzes and determines the RF spectral characteristics needed to nullify the communication control signals of the suspect sUAS 44.

During the identification process, the system will also conduct an automated threat assessment to determine if the suspect sUAS is carrying a payload of concern (size and shape) by comparing video/photo analytics and radar signatures, to include visual inspection/verification by the system operator, and evaluate other concerning data, such as detection of an encrypted video downlink, flight profile or course, to generate a continuous threat assessment. By comparing known non-threatening SUAS analytic profiles with known threatening SUAS profiles, the system data mining processes can classify a targeted SUAS with an initial threat level or advance to a higher threat level if additional concerning data is received or observed. The system continuously monitors the location and threat assessment information of the targeted SUAS allowing the system operator live information prior to deterring the SUAS with a non-kinetic interdiction response or destroy the SUAS if the system is armed with a kinetic countermeasure device.

The fourth function of the system, 540 of FIG. 5, is to deter/interdict the operation of a targeted SUAS that has entered into the system boundaries or protected area. Section 102 of FIG. 2 and Item 32 of FIGS. 1A, 2, 3 and 4 of the non-limiting embodiments(s) is the deterrence process. This process can use either a non-destructive method to force the SUAS to land or return to its departure location or a destructive method in stopping/destroying a sUAS threat. FIG. 5, section 540, represents a non-destructive method utilizing a Multi Band High Gain Directional antenna array 10 using vertical polarization to transmit RF signals directly at the targeted sUAS 44. These RF waveforms are then used to disrupt the expected inputs to the onboard controller of the targeted SUAS 44. However, depending on the operational environment; a non-destructive system may be augmented or coupled with a destructive system consisting of a kinetic weapon system.

The system's non-destructive deterrence against a targeted SUAS is achieved by transmitting the most advantageous RF frequency derived based on the identification information obtained from RF frequency database 42 and RF spectral analysis 36 derived in Step 2 and 3. This concentrated Radio Frequency (RF) emission tuned to the specific SUAS characteristics identified by the spectral analysis during the detection process is obtained when the communications link, or any other RF emission generated by subject SUAS is detected by the Radio Frequency (RF) detection section 103 of the system. Information is passed through the Multiband LNA Assembly 20 and through the Uplink Receive Host Workstation 24. The information is then sent to the Spectral Signal Detect and Type Identification unit 36 where the type of SUAS is determined based on a known SUAS RF profile database containing Spectral Signal Wave information 36. When the Spectral Signal Waveform information is known the information is sent to the Frequency and Wave Form Parameters unit 40 where the analyzed RF data is sent to the Modulation Look Up Table 42. When the Modulation characterization is made, that data is transferred to the ECM Modulation Type Select processor 38 where the non-limiting embodiments(s) creates a uniquely tailored waveform. The selected modulation waveform is then sent to the Uplink Video Transmitter Assembly 28. That unit works in conjunction with the Receive Blanking unit 30. When the Uplink Video Transmitter 28 is transmitting a radio signal the Receive Blanking unit 30 will force the DF antennae 12, 14 to stop receiving the radio frequency being transmitted by the Matrix Directional Transmit Antenna Array 10. The radio frequency selected to disrupt the communication link between the targeted SUAS 44 and its' operator is then transmitted by the Transmitter Assembly 28 using the Matrix Directional Transmit Antenna Array 10 aimed at the SUAS 44 via the Automatic Antenna Alignment Assembly 18. The countermeasure and deterrent section 102 broadcasts this unique generated RF waveform using highly directional and focused antennae 10. The system uses Blanking 30 at the time between the last radio transmitting signal and the beginning of the next radio-transmitting signal of the transmitted signal in accordance with the frequency and waveform parameters 40 to avoid negative internal effects to system 103.

The countermeasure and deterrent section 102 of the system 100 interdicts the operation of a targeted SUAS in a non-destructive manner by using the non-destructive technology described above to generate an interdict transmission signal that is significantly higher gain (Stronger Signal) than the control signals produced from an operator control unit transmitting to the targeted SUAS 44. The video downlink frequency is the initial target of the interdiction process. If this interruption is not sufficient to deter the targeted SUAS 44, the RF transmitter will be tuned to the appropriate control frequency to disrupt the targeted SUAS 44 on-board electronics increasing the probability of the targeted SUAS 44 entering into its "Fail Safe Mode". This action is SUAS specific and is based on the manufacturer design and SUAS operational capabilities. The interdict transmission will target both the sensor and the control electronics of the SUAS. The effects of the higher gain radio transmission will cause amongst other effects, servo-chatter and disruption of most on-board electronic processes resulting in the loss of control of the targeted SUAS 44 or forcing it to land or return back to its departure location (Fail Safe Mode).

The non-limiting embodiments(s) considers the differences based on the manufacturer design and operational capabilities of the SUAS on a case-by-case basis and tailors the systems countermeasure/deterrent response accordingly. The interdiction process may be augmented with electromagnetic pulse technology, pulsed laser and is specifically designed to accept other current or future counter-measures used to defeat the SUAS' electronics, motors and or navigation systems. In addition, a separate, system operated, SUAS can be dispatched with autonomous navigation data being supplied by the system of non-limiting embodiments(s) to locate and intentionally disable the opposing SUAS by flying into it, dropping a net on the threat, covering it with spray foam or liquid or capturing the opposing sUAS.

Example Non-Limiting Threat Assessment Process

Figure 6:
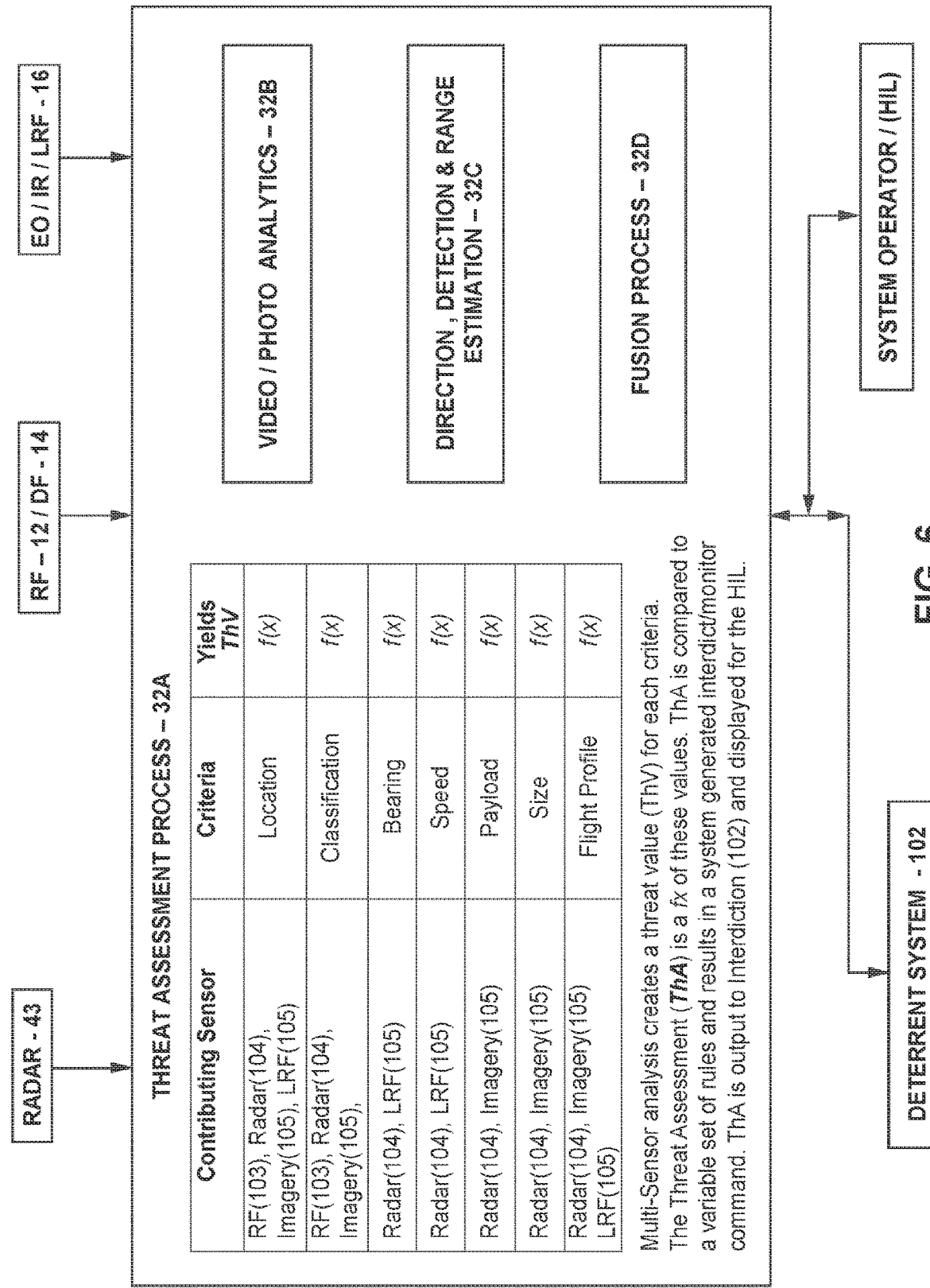
FIG. 6 is an example non-limiting process diagram for an embodiment of the sensor fusion processor.

FIG. 6 shows an example non-limiting sensor fusion and threat assessment process performed by sensor fusion processor 32. In the example non-limiting embodiment, sensor fusion processor 32 receives and processes the inputs of many different sensors, i.e., radar 43, radio frequency receiving antennas 12 and 14 (including the azimuth/elevation coordinates of receive directional antenna array 12, optical/infrared sensor and laser range finder 16 (including associated azimuth and elevation information). Processing is performed based on video-photo analytics 32B, direction, detection and range estimation 32C, and a fusion process 32D.

From the radar 43, sensor fusion processor 32 receives information indicative of detected target presence, detected target size, detected target range, number of detected targets and three-dimensional (XYZ) position of each detected target. Radar 43 also provides information concerning detected target speed and direction. In some embodiments, the radar 43 provides such information in the form of a display image that sensor fusion processor 32 analyzes to extract useful information. In other embodiments, radar 43 may provide data packets encoding such information periodically, on demand or otherwise.

From directional RF antenna 12, sensor fusion processor 32 receives information indicative of azimuth and elevation (direction in 2 dimensions) of a transmitting entity, signal strength of received transmissions, frequencies on which the transmissions are occurring (such information can be derived using a spectrum analyzer for example) and in some cases the content of transmission including identifiers and the like.

From omnidirectional RF antenna 12, sensor fusion processor 32 receives signal strength of received transmissions, frequencies on which the transmissions are occurring (such information can be derived using a spectrum analyzer for example) and in some cases the content of transmission including identifiers and the like. The omnidirectional antenna 14 functions even when the directional antenna 14 is not (yet) aimed at the target.

From EO/IR/LRF 16, sensor fusion processor 32 receives target range information, target direction information (three-dimensional position XYZ coordinates in the best case) as well as target movement and speed of movement information. In some embodiments, the sensor fusion processor 32 also receives images (IR, visible light or both) of the target that can help with target identification.

As can be seen in FIG. 6, the sensor fusion processor 32 uses different combinations of these sensor inputs to determine different characteristics concerning the target. For example, sensor fusion processor 32 can detect target location based on the RF related information, the radar information, the imagery information and the laser range finder information. The sensor fusion processor 32 may attempt to classify the target based on RF information, radar information and imagery. The sensor fusion processor 32 may determine a bearing/heading for the target and the speed of the target along that bearing/heading based on the radar and LRF information. The sensor fusion processor 32 may determine the size/shape of the target and presence of a payload on the target based on radar and imagery. The sensor fusion processor 32 may determine a flight profile for the target based on radar, imagery and LRF.

The sensor fusion processor 32 in the example non-limiting embodiment is able to process different inputs with different algorithm and then correlate or filter results to obtain a more accurate value than would be possible using single sensor inputs. For example, radar 43 and laser range finder 16 each provide target range information, but different conditions and factors such as weather, nature of the target, ambient lighting, interference and other factors can affect these two independent sensing mechanisms differently. The LRF 16 for example may be more accurate at closer ranges in lower light conditions, whereas the radar 43 may be more accurate at further ranges when there is no precipitation. Sensor fusion processor 32 takes such differences in sensor performance into account when weighting and filtering the different inputs in order to optimize accuracy and reliability.

Based on this multi-sensor analysis and data mining process via all available data inputs, the sensor fusion processor 32 creates a threat value (ThV) for each criterion and in particular uses a ranking methodology applied to the established logic of multi-criteria analysis to create a threat value (ThV) for each criteria which include; Location, Target Classification, Bearing, Speed, Payload, Size, and Flight Profile. The threat assessment (ThA) of a function (fx) of these values. The ThA is compared to a variable set of rules and results in a system generated interdict/monitor command. The ThA is outputted to an interdiction system (102) and displayed for a human in the loop (HIL). Part of the function of sensor fusion processor 32 is to develop a confidence factor that is used to determine whether to interdict and what type of interdiction to command. For example, potentially destructive interdiction is not commanded unless the confidence value is high.

Threat Assessment (ThA) in one non-limiting embodiment is the level of threat assigned a specific target after application of the analytic processes as well as potential data from external sources, data mining, as well as consideration of the ThV. ThA is based on the sum of ThV of each criteria which is derived from data provided by the systems input sensors: radar, RF detection, EO/IR imagery, and range. Each sensor that is currently functioning contributes to the algorithm based on that sensor's observed phenomenology. Fault tolerance is provided by continuing to operate with all available information even when one or more sensors is damaged, has failed or is otherwise not providing useful information.

Rule sets, which may be varied, specify the required interdiction action taken for a given ThA, e.g., ThA of 10 results in an immediate full power interdiction transmission, continuing until the target is neutralized; ThA of 1 generates a monitor only response.

As example:

| Contributing Sensor Criteria | Criteria | ThV | Weight | ThV (weighted) |
|---|---|---|---|---|
| RF, Radar, Imagery, LRF | Location | 3 | 1 | 3 |
| RF, Radar, Imagery | Classification | 5 | 1 | 5 |
| Radar, LRF | Bearing | −1 | 2 | −2 |
| Radar, LRF | Speed | 1 | 2 | 2 |
| Radar, Imagery | Payload | 5 | 2 | 10 |
| Radar, Imagery | Size | 3 | 1 | 3 |
| Radar, Imagery, LRF | Flight Profile | 3 | 1 | 3 |
| Threat Assessment (ThA) | | | | 24 |

In this example, the ThA of 24 would result in immediate interdiction; the presence of an observable threatening payload. Such a ThA makes it a very high priority target. This assessment is an iterative process until the target either leaves the area of concern or is interdicted.

Glossary

Algorithm—a process or set of rules to be followed in calculations or other problem-solving operations by a computer C2 Communications—Command and Control Communications links Commercial—relating to or engaged in commerce (i.e., NON-military)

Counter—to offer in response or act in opposition

CUASs2—Counter Unmanned Aerial Systems of Systems, the system of the non-limiting embodiments(s) used to detect, identify/classify, track and deter or interdict small unmanned aerial vehicles or systems Emitter—to send or give out a matter of energy EO—Electro-Optics is a branch of electrical engineering and materials science involving components, devices and systems that operate by modification of the optical properties of a material by an electric field, thus it concerns the interaction between the electromagnetic (optical) and the electrical (electronic) states of materials Fire control—The computer connection between the tracking optic and the fire control trigger, located at the system operator (HIL) console. The computer contains dozens of microprocessors and electronic, electro-optic, and electro-mechanical components that guide the release (firing) of the chosen countermeasure to ensure an accurate engagement over great distances Frequency—the rate at which a vibration occurs that constitutes a wave, either in a material (as in sound waves), or in an electromagnetic field (as in radio waves and light), usually measured per second Jam or Jammed or Jammers or Jamming—to interfere with or prevent the clear reception of broadcast signals by electronic means to become unworkable or to make unintelligible by sending out interfering signals by any means Laser—a device that emits light through a process of optical amplification based on the stimulated emission of electromagnetic radiation Matrix—an environment in which something develops Mobile Platform (MP)—the system installed on any vehicle with the intent to move from one location to another location as needed to fulfill a short-term need in the detection, tracking, identification/classification and deterrence or interdiction of a small unmanned aerial system (SUAS)

Modulation—the process of varying one or more properties of a periodic waveform, called the carrier signal, with a modulating signal that typically contains information to be transmitted Multi-Band—a communication device that supports multiple radio frequency bands OTS—Off The Shelf refers to materials or equipment that currently exists and is readily available for purchased or use Permanent Platform (PP)—the system installed at a specific location to fulfill a long-term need in the detection, tracking, identification/classification and deterrence or interdiction of a small unmanned aerial system (SUAS)

Pulse—a single vibration or short burst of sound, electric current, light, or other wave RPA—Remotely Piloted Aircraft, aka UAV, UAS RF—Radio Frequency is a rate of oscillation in the range of around 3 kHz to 300 GHz, which corresponds to the frequency of radio waves, and the alternating currents that carry radio signals Target—something or someone of interest to be affected by an action or development Threat—a declaration or an act of an intention or determination to inflict the destruction of property or harm, punishment, injury or death of person(s)

UAS—Unmanned Aerial System, (aka UAV, RPA)

UAV—Unmanned Aerial Vehicle, (aka UAS, RPA)

Uplink—the part of a network connection used to send, or upload, data from one device to a remote device Vector—a quantity having direction as well as magnitude, especially as determining the position of one point in space relative to another Watt—the system unit of power, equivalent to one joule per second, corresponding to the power in an electric circuit in which the potential difference is one volt and the current one ampere Waveform—a graphic representation of the shape of a wave that indicates its characteristics as frequency and amplitude.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A system for interdicting an unmanned aerial target, comprising:
   at least one radar;
   one or more processors coupled to the at least one radar, said one or more processors configured to determine direction and range to the unmanned aerial target in response to the at least one radar; and
   a counter unmanned aerial vehicle dispatchable by the system to interdict the unmanned aerial target, a flight path of the counter unmanned aerial vehicle initiated by a transmitted RF signal from the one or more processors to the counter unmanned aerial vehicle.

2. The system of claim 1, wherein said RF signal comprises deploying the launch of the counter unmanned aerial vehicle.

3. The system of claim 1, wherein said RF signal comprises directing at least a portion of the flight path of the counter unmanned aerial vehicle toward the unmanned aerial target.

4. The system of claim 1, wherein said counter unmanned aerial vehicle intercepts the unmanned aerial target and/or flies in proximity to the unmanned aerial target.

5. The system of claim 1 wherein the counter unmanned aerial vehicle disables the unmanned aerial target and/or captures the unmanned aerial target.

6. The system of claim 1, wherein said unmanned aerial target comprises a drone weighing less than 20 kg or 55 pounds.

7. The system of claim 1, wherein said counter unmanned aerial vehicle flies into said unmanned aerial target while said unmanned aerial target is in flight.

8. The system of claim 1, wherein said counter unmanned aerial vehicle captures said unmanned aerial target while said unmanned aerial target is in flight.

9. The system of claim 1, wherein said counter unmanned aerial vehicle drops a net on said unmanned aerial target while said unmanned aerial target is in flight.

10. The system of claim 1, wherein the one or more processors execute a computer program capable of processing radar and RF sensor data to perform a threat assessment to initiate a counter measure.

11. A system for interdicting an unmanned aerial target, comprising:
    at least one radar;
    one or more processors coupled to the at least one radar, said one or more processors configured to determine direction and range to the unmanned aerial target in response to the at least one radar; and
    a counter unmanned aerial vehicle dispatched by a transmitted RF signal from the one or more processors to the counter unmanned aerial vehicle.

12. The system of claim 11, wherein said RF signal comprises deploying the launch of the counter unmanned aerial vehicle.

13. The system of claim 11, wherein said RF signal comprises directing at least a portion of the flight path of the counter unmanned aerial vehicle toward the unmanned aerial target, wherein said counter unmanned aerial vehicle intercepts the unmanned aerial target and/or flies into proximity with the unmanned aerial target and/or disables the unmanned aerial target and/or captures the unmanned aerial target.

14. The system of claim 11, wherein said unmanned aerial target comprises a drone weighing less than 20 kg or 55 pounds.

15. The system of claim 11, wherein said counter unmanned aerial vehicle flies into said unmanned aerial target while said unmanned aerial target is in flight.

16. The system of claim 11, wherein said counter unmanned aerial vehicle captures said unmanned aerial target while said unmanned aerial target is in flight.

17. The system of claim 11, wherein said counter unmanned aerial vehicle drops a net on said unmanned aerial target while said unmanned aerial target is in flight.

18. The system of claim 11, wherein the one or more processors executes a computer program capable of processing radar and RF sensor data to perform a threat assessment to initiate a counter measure.

19. A system for interdicting an unmanned aerial target, comprising:
    at least one omnidirectional RF sensor;
    at least one radar;
    at least one processor coupled to the at least one omnidirectional RF sensor, and the at least one radar, the at least one processor configured to detect a target and determine direction and range of the target in response to the at least one omnidirectional RF sensor and the at least one radar; and
    a counter unmanned aerial vehicle dispatched by a transmitted RF signal from the at least one processor to the counter unmanned aerial vehicle.

20. The system of claim 19, wherein said RF signal comprises deploying the launch of the counter unmanned aerial vehicle.

21. The system of claim 19, wherein said RF signal comprises directing at least a portion of the flight path of the counter unmanned aerial vehicle toward the unmanned aerial target.

22. The system of claim 19, wherein said counter unmanned aerial vehicle intercepts the unmanned aerial target.

23. The system of claim 19, wherein said counter unmanned aerial vehicle flies into proximity with the unmanned aerial target.

24. The system of claim 19, wherein said counter unmanned aerial vehicle disables the unmanned aerial target.

25. The system of claim 19, wherein said counter unmanned aerial vehicle captures the unmanned aerial target.

26. The system of claim 19, wherein said unmanned aerial target comprises a drone weighing less than 20 kg or 55 pounds.

27. The system of claim 19, wherein said counter unmanned aerial vehicle flies into said unmanned aerial target while said unmanned aerial target is in flight.

28. The system of claim 19, wherein said counter unmanned aerial vehicle captures said unmanned aerial target while said unmanned aerial target is in flight.

29. The system of claim 19, wherein said counter unmanned aerial vehicle drops a net on said unmanned aerial target while said unmanned aerial target is in flight.

30. A system for interdicting an unmanned aerial target drone, comprising:
- at least one RF sensor;
- at least one radar; and
- one or more processors operatively connected to the at least one RF sensor and the at least one radar, the one or more processors configured to detect the unmanned aerial target drone and determine direction and range of the unmanned aerial target drone in response to the at least one RF sensor and the at least one radar;
- wherein the one or more processors execute a computer program capable of processing data acquired from the at least one RF sensor and the at least one radar, to perform a threat assessment and to select and initiate an appropriate counter measure against the unmanned aerial target drone in flight based at least in part on the threat assessment.

* * * * *